United States Patent
Bonnell et al.

(10) Patent No.: US 10,041,006 B2
(45) Date of Patent: *Aug. 7, 2018

(54) METHODS, SYSTEMS, AND APPARATUSES FOR RECYCLING FISCHER-TROPSCH WATER AND FISCHER-TROPSCH TAIL GAS

(71) Applicant: SGCE LLC, Pasadena, TX (US)

(72) Inventors: Leo Bonnell, Houston, TX (US); Miguel A. F. Santos, Sugar Land, TX (US); Scott Golczynski, Houston, TX (US); Bruce Allen Logue, II, Sugar Land, TX (US)

(73) Assignee: SGCE LLC, Pasadena, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/315,127

(22) PCT Filed: May 29, 2015

(86) PCT No.: PCT/US2015/033233
§ 371 (c)(1),
(2) Date: Nov. 30, 2016

(87) PCT Pub. No.: WO2015/184290
PCT Pub. Date: Dec. 3, 2015

(65) Prior Publication Data
US 2017/0096604 A1   Apr. 6, 2017

Related U.S. Application Data

(60) Provisional application No. 62/005,102, filed on May 30, 2014.

(51) Int. Cl.
*C10G 2/00* (2006.01)
*C01B 3/34* (2006.01)
*C01B 3/36* (2006.01)

(52) U.S. Cl.
CPC .............. *C10G 2/32* (2013.01); *C01B 3/34* (2013.01); *C01B 3/36* (2013.01); *C10G 2/34* (2013.01);
(Continued)

(58) Field of Classification Search
CPC . C01B 3/382; C01B 3/384; C01B 2203/0233; C01B 2203/0244;
(Continued)

(56) References Cited

U.S. PATENT DOCUMENTS

2007/0010590 A1* 1/2007 Abbott ............... B01J 8/025
518/703
2014/0357737 A1* 12/2014 Abbott ............... C10K 1/005
518/704

OTHER PUBLICATIONS

Office action dated Jan. 22, 2018 for counterpart Canadian Application No. 2950288, 4 pages.

* cited by examiner

*Primary Examiner* — Jafar Parsa
(74) *Attorney, Agent, or Firm* — Timothy S. Westby; Porter Hedges LLP

(57) ABSTRACT

A method of producing reformed gas as part of a Fischer-Tropsch ("FT") hydrocarbon synthesis is disclosed, including the steps of superheating at least a first portion of an FT tail gas produced as a by-product of an FT synthesis process, and forming a mixed gas by injecting at least a portion of an FT water stream, produced as a by-product of an FT synthesis process, into the superheated FT tail gas to form a mixed gas. The mixed gas is used as a feed to a front end of a syngas preparation unit. The amount of at least a portion of the FT water stream is selected to keep the mixed gas at least mostly and preferably entirely in a vapor phase. In some embodiments, a water-gas shift reactor converts the (Continued)

mixed gas to a converted mixed gas upstream of the front end. Other methods, apparatuses and systems are disclosed.

23 Claims, 10 Drawing Sheets

(52) U.S. Cl.
CPC ............... *C01B 2203/0216* (2013.01); *C01B 2203/0255* (2013.01); *C01B 2203/062* (2013.01); *C01B 2203/1241* (2013.01)

(58) Field of Classification Search
CPC ...... C01B 2203/0405; C01B 2203/042; C01B 2203/062; C01B 2203/0844; C01B 2203/1241; C01B 2203/141; C01B 2203/143; C01B 2203/82; C10G 70/00; C10G 2/32; C10G 9/36; C10G 35/04; C10G 2300/807
See application file for complete search history.

METHODS, SYSTEMS, AND APPARATUSES FOR RECYCLING FISCHER-TROPSCH WATER AND FISCHER-TROPSCH TAIL GAS

RELATED APPLICATIONS

This application claims priority to U.S. Provisional Application No. 62/005,102 entitled "Methods, Systems, and Apparatuses for Recycling Fischer-Tropsch Water and Fischer-Tropsch Tail Gas, having assignee patent file number GI-0032-US-P01, incorporated in its entirety by reference. This application is also related to co-assigned U.S. Provisional Application No. 62/005,118, entitled "Methods, Systems, and Apparatuses for Utilizing a Fischer-Tropsch Purge Stream" and having assignee patent file number GI-0037-US-P01, incorporated in its entirety by reference, for all purposes not contrary to this disclosure.

STATEMENT REGARDING FEDERALLY SPONSORED RESEARCH OR DEVELOPMENT

Not applicable.

BACKGROUND

Field of the Invention

This invention relates to a system and method for Fischer Tropsch gas to liquid hydrocarbon production; specifically it relates to a system and method for injecting Fischer Tropsch water into a Fischer Tropsch tail gas prior to recycling the Fischer Tropsch tail gas to a front end of a syngas preparation unit for reformed gas (also called "synthesis gas," or "syngas") production, as part of a Fischer Tropsch natural gas to liquid hydrocarbon process.

Background of the Invention

The Fischer-Tropsch (or "Fischer Tropsch," "F-T" or "FT") process (or synthesis or conversion) involves a set of chemical reactions that convert a mixture of carbon monoxide and hydrogen (known as reformed gas, synthesis gas, or "syngas") into liquid hydrocarbons (called "liquid FT hydrocarbons" herein). The liquid FT hydrocarbons may include a wax ("FT wax") that may be liquid when produced but becomes solid as it cools. The process was first developed by German chemists Franz Fischer and Hans Tropsch in the 1920's. The FT conversion is a catalytic and exothermic process. The FT process is utilized to produce petroleum substitutes, typically from carbon-containing energy sources such as coal, natural gas, biomass, or carbonaceous waste streams (such as municipal solid waste), such petroleum substitutes being suitable for use as synthetic fuels, waxes and/or lubrication oils. The carbon-containing energy source is first converted into a reformed gas, using a syngas preparation unit in a syngas conversion. Depending on the physical form of the carbon-containing energy source, syngas preparation may involve technologies such as steam methane reforming, gasification, carbon monoxide shift conversion, acid gas removal, gas cleaning and conditioning. These steps convert the carbon source to simple molecules, predominantly carbon monoxide and hydrogen, which are active ingredients of synthesis gas. Syngas also contains carbon dioxide, water vapor, methane, and nitrogen. Impurities deleterious to catalyst operation such as sulfur and nitrogen compounds are often present in trace amounts and are removed to very low concentrations, often as part of synthesis gas conditioning. Once the syngas is created and conditioned, the syngas is used as an input to an FT reactor having an FT catalyst to make the liquid FT hydrocarbons in a Fischer-Tropsch synthesis process. Depending on the type of FT reactor that is used, the FT conversion of the syngas to liquid FT hydrocarbons takes place under appropriate operating conditions.

Turning to the syngas conversion step, to create the syngas from a natural gas feedstock, for example, methane in the natural gas reacts with steam and/or oxygen in a syngas preparation unit to create syngas. The syngas comprises principally carbon monoxide, hydrogen, carbon dioxide, water vapor and unconverted methane. Some types of syngas preparation units use syngas catalysts (also called "reformer catalysts"), while others do not. When partial oxidation is used to produce the synthesis gas, the syngas typically contains more carbon monoxide and less hydrogen than is optimal and, consequently, the steam is added to the react with some of the carbon monoxide in a water-gas shift reaction. The water gas shift reaction can be described as:

$$CO+H_2O \leftrightarrows H_2+CO_2 \tag{1}$$

Thermodynamically, there is an equilibrium between the forward and the backward reactions. That equilibrium is determined by the concentration of the gases present.

Turning now to the FT conversion step, the Fischer-Tropsch (FT) reactions for the FT conversion of the syngas to the liquid FT hydrocarbons may be simplistically expressed as:

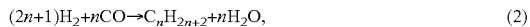

$$(2n+1)H_2+nCO \rightarrow C_nH_{2n+2}+nH_2O, \tag{2}$$

where 'n' is a positive integer.

The FT reaction is performed in the presence of a catalyst, called a Fischer-Tropsch catalyst ("FT catalyst"). Unlike a reagent, a catalyst does not participate in the chemical reaction and is not consumed by the chemical reaction itself, but accelerates the chemical reaction. In addition, a catalyst may participate in multiple chemical transformations. Catalytic reactions have a lower rate-limiting free energy of activation than the corresponding un-catalyzed reaction, resulting in higher reaction rate at the same temperature. However, the mechanistic explanation of catalysis is complex. Catalysts may affect the reaction environment favorably, or bind to the reagents to polarize bonds, e.g. acid catalysts for reactions of carbonyl compounds, or form specific intermediates that are not produced naturally, such as osmate esters in osmium tetroxide-catalyzed dihydroxylation of alkenes, or cause lysis of reagents to reactive forms, such as atomic hydrogen in catalytic hydrogenation.

In addition to liquid FT hydrocarbons, Fischer-Tropsch synthesis also commonly produces gases ("Fischer-Tropsch tail gases" or "FT tail gases") and water ("Fischer-Tropsch water" or "FT water"). The FT tail gases typically contain CO (carbon monoxide), $CO_2$ (carbon dioxide, which may also be written informally as "CO2"), $H_2$ (hydrogen), light hydrocarbon molecules, both saturated and unsaturated, typically ranging from $C_1$ to $C_4$, and a small amount of light oxygenated hydrocarbon molecules such as methanol. Typically, the FT tail gases are mixed in an FT facility's fuel gas system for use as fuel.

The FT water may also contain contaminants, such as dissolved hydrocarbons, oxygenates (alcohols, ketones, aldehydes and carboxylic acids) and other organic FT products. Typically, the FT water is treated in various ways to remove the contaminants and is properly disposed of.

FIG. 1 and FIG. 2 depict conventional systems. FIG. 1 depicts a simplified block diagram for a conventional Fischer Tropsch system, including a steam methane reformer configuration. Natural gas 102 and steam 104 enter a syngas preparation unit 130, which, in the example of FIG. 1 comprises a steam methane reformer ("SMR"). Alternate conventional syngas preparation units may include an autothermal reformer, a hybrid reformer, or a partial oxidation reformer. A flue gas 132 and a reformed gas (or "syngas") 134 exit the SMR 130 via a first flowline and a second flowline (not numbered in FIG. 1 separately from the fluids therein) respectively. The reformed gas 134 typically includes hydrogen, carbon monoxide, carbon dioxide, water vapor, nitrogen and methane. The reformed gas 134 passes to a syngas conditioning unit 160, whereby the reformed gas 134 is cooled, a process condensate stream 162 is recovered, and the hydrogen and carbon monoxide ratios of the reformed gas 134 are adjusted if necessary. A conditioned reformed gas 165 is sent via a third flowline (not numbered separately from the fluids therein) to a Fischer-Tropsch ("FT") synthesis reactor 170. Outputs for the FT reactor 170 include an FT tail gas 172 that may be sent to a fuel system (not depicted), an FT water stream 174 that may be sent to a treatment system (not depicted), and a liquid FT hydrocarbon stream 180.

FIG. 2 depicts a more detailed view of the conventional SMR 130 of FIG. 1 and some of its associated equipment. A fuel gas flowline 206 conveying a fuel gas passes through a first flow control regulator 208 to a first burner 209a and a second burner 209b of the SMR 130. A first combustion air flowline 211 passes combustion air through a forced draft fan 212. A second combustion air flowline 213 conveys the combustion air from the forced draft fan 212 to a combustion air heater 214, which heats the combustion air. The heated combustion air passes via a third combustion air flowline 215 to the first and second burners 209a, 209b, where the heated combustion air is mixed and combusted with the fuel gas.

Continuing to refer to FIG. 2, a first natural gas feed flowline 202 conveys a natural gas feed to a natural gas preheater 241, which heats the natural gas feed. The preheated natural gas feed is conveyed through a second natural gas feed flowline 227 to a mixed feed preheater coil 228, downstream of an intersection with a second flow control regulator 226, which injects steam into the natural gas feed (further described below) to form a mixed gas feed. The mixed feed preheater coil 228 heats the mixed gas feed. A mixed feed gas flowline 229 conveys the heated mixed gas feed from the mixed feed preheater coil 228 to an input (not separately depicted) of an SMR tube 210 containing a steam methane reformer catalyst (not separately depicted). Various appropriate steam methane reformer catalysts are commercially available, including but not limited to those offered by Clariant and Johnson-Mathey. Exposed to higher temperatures from the first and second burners 209a, 209b and to the steam methane reformer catalyst, the heated mixed gas feed becomes a reformed gas. A reformed gas flowline 231 conveys the reformed gas from an output (not separately depicted) of the SMR tube 210 to a reformed gas boiler 239.

Referring again to FIG. 2, a boiler feed water line 201 conveys a boiler feed water stream to a steam drum 216. A first water line 235 conveys water from the steam drum 216 to the reformed gas boiler 239. A steam-water mixture is returned from the reformed gas boiler 239 to the steam drum 216 via natural circulation through a mixture flowline 236. A second water line 217 conveys water from the steam drum 216 to a steam generator 218 that generates steam from the water. A first steam flowline 219 conveys the steam from the steam generator 218 to the steam drum 216. Steam leaves the steam drum 216 via a second steam flowline 220a, 220b. Part of the steam in the second steam flowline 220a may be diverted through a third steam flowline 221 connected to the second steam flowline 220a. (Upstream of connection to the third steam flowline 221, the second steam flowline is designated as 220a in FIG. 2, while downstream the second steam flowline is designated 220b.) The third steam flowline 221 may convey the diverted part of the steam to a turbine or to other parts of the plant. The second steam flowline 220b carries remaining steam, which was not diverted to the third steam flowline 221, to a steam superheater 223. The steam superheater 223 superheats the remaining steam to very high temperatures. For example, if the steam leaving the steam drum 216 in the second steam flowline 220a was at a temperature of about 450° F., then the steam superheater 223 may typically heat the remaining steam to a temperature of about 700° F. Superheated steam leaves the steam superheater 223 via a fourth steam flowline 224. The fourth steam flowline 224 is connected to a fifth steam flowline 261. The second flow control regulator 226 is positioned on the fifth steam flowline 261, downstream of its connection with the fourth steam flowline 224. Downstream of its connection with the fifth steam flowline 261, the fourth steam flowline 224 is connected to a third flow control regulator 225. The fifth steam flowline 261 feeds the a part of the superheated steam from the fourth steam flowline 224 into the second natural gas flowline 227 to be mixed with the natural gas in the second natural gas flowline 227, upstream of the mixed feed preheater coil 228. The second and third flow control regulators 226, 225 may be adjusted to allow a predetermined amount of the superheated steam into the second natural gas flowline 227. Thus, a mixture of steam and natural gas are conveyed as the mixed feed gas in the mixed feed gas flowline 229 from the mixed feed preheater coil 228 to the input of the SMR tube 210.

Referring again to FIG. 2, when the reformed gas in the reformed gas flowline 231 has exited the SMR tube 210, the reformed gas may be at very high temperatures. A temperature of about 1600° F. for the reformed gas might be typical. The reformed gas flowline 231 conveys the reformed gas to the reformed gas boiler 239, which can cool the reformed gas to a first lower temperature, as an example, down to 800° F. Such a temperature may still be considered hot. A second reformed gas flowline 240 conveys the reformed gas, at the first lower temperature, from the reformed gas boiler 239 to the natural gas preheater 241, where the first lower temperature of the reformed gas is used to heat the natural gas feed from the first natural gas feed flowline 202. The reformed gas then passes through a third reformed gas flowline 234 to optional further cooling and/or treatment and to the FT reactor (not depicted in FIG. 2). A flue gas exits the SMR 130 via a flue gas flowline 232, which carries the flue gas to an induced draft fan 233 and from the induced draft fan 233 to a flue gas stack 237.

In the conventional SMR 130 of FIGS. 1 and 2, the FT tail gas may be mixed in a facility's fuel gas system for use as fuel. The FT water may contain contaminants, such as dissolved hydrocarbons, oxygenates (alcohols, ketones, aldehydes and carboxylic acids) and other organic FT products. Typically, the FT water is treated in various ways to remove the contaminants and is properly disposed of.

U.S. Pat. No. 7,323,497 B2 by Abbott et al. ("Abbott"), incorporated in its entirety herein by reference for all purposes not contrary to this disclosure, describes an alternative to the conventional process described above with respect to FIGS. 1 and 2. Abbott includes the step of feeding "co-produced water" [FT water] "to a saturator wherein it is contacted with hydrocarbon feedstock to provide at least part of the mixture of hydrocarbon feedstock and steam subjected to steam reforming." (Abstract. See also Col. 10, lines 14-17.) However, while saturators are efficient, they may be expensive. In addition, saturators generally require a blow-down, the results of which must be properly disposed of. Moreover, using a saturator, the heated FT water in the saturator has a long residence time, which may result in unwanted side reactions among impurities producing heavy by-products. Abbott also discloses at least a two-stage reforming process. In the first stage, a partially reformed gas is produced through steam reforming. The steam reforming is performed after saturation of the feedstock with steam, the water for which may include FT water from the saturator. See Abbott, Column 4, lines 20-37. The steam reforming step may include "one or more (preferably one or two) stages of pre-reforming and/or primary steam reforming, to form a partially reformed gas." (Abbott, Column 4, lines 45-49.) In a second stage, the partially reformed gas:

> is then subjected to a step of partial combustion. The partially reformed gas fed to the partial combustion vessel may preferably additionally comprise a tail gas from the Fischer-Tropsch synthesis and/or, carbon dioxide recovered from the synthesis gas. Where primary and secondary reforming are used to produce the reformed gas stream it may also be desirable, in order to reduce the reforming duty on the primary reformer, to bypass a portion of the hydrocarbon (or hydrocarbon/steam mixture) around the primary reformer and feed it directly to the secondary reformer. In forming the feed stream for the partial combustion stage, the Fischer-Tropsch tail gas, and/or carbon dioxide and/or second hydrocarbon stream, may be combined separately in any order to the partially reformed gas or may be pre-mixed if desired before being fed to the partially reformed gas.

(Abbott, Column 5, lines 19-34.) The partial combustion stage includes "combustion with a gas containing free oxygen supplied via burner apparatus." Abbott, Column 5, lines 50-53. After combustion, "the hot partially combusted gas then passes through a bed of steam reforming catalyst to form the reformed gas mixture." Abbott, Column 6, lines 25-27. Thus, in Abbott, the FT tail gas (and/or carbon dioxide and/or a second hydrocarbon) may be "added to the partially reformed gas before partial combustion thereof." Abbott, Claim 7. In addition, Abbott indicates to "avoid the undesirable build up of inerts, it is desirable only to utilize tail gas recycle when the partial combustion step is performed using substantially pure oxygen." Abbott, Column 8, lines 27-30. Sometimes, pure oxygen, as in the desirable embodiments disclosed by Abbott, is not readily available or is expensive to obtain. In addition, a single stage reformer might be preferred for some applications.

Abbott further discloses, "Typically the de-watered synthesis gas contains 5 to 15% by volume of carbon dioxide (on a dry basis). In one embodiment of the invention, after separation of the condensed water, carbon dioxide may be separated from the de-watered synthesis gas prior to the Fischer-Tropsch synthesis stage and recycled to the synthesis gas production. Such recycle of carbon dioxide is preferred as it provides a means to control H2/CO ratio to achieve the optimal figure for FT synthesis of about 2." (Abbott at Column 7, lines 5-13.)

U.S. Pat. No. 8,168,684 to Hildebrandt, et al. ("Hildebrandt"), incorporated in its entirety herein by reference for all purposes not contrary to this disclosure, discloses a Fischer Tropsch process with "$CO_2$ rich syngas." Hildebrandt defines a "$CO_2$ rich syngas" as "a gas mixture in which there is $CO_2$, $H_2$ and CO. The $CO_2$ composition in this mixture is in excess of the $CO_2$ which would usually occur in conventional syngas." (Hildebrandt, Column 2, lines 17-20.) The example described therein used coal as a feedstock. (See Hildebrandt at Col. 4, line 32: "The feed considered was coal.") Hildebrandt also mentions the use of feedstocks comprising methane from natural gas (Hildebrandt at Col. 3, lines 36-40 and Col. 5, lines 23-25) and gas "generated by fermentation of natural waste dumps" (Hildebrandt at Col. 5, lines 23-25). Hildebrandt at Col. 2, lines 20-21 further states, "The $CO_2$ is utilized as a reactant and is converted into the desired product." Claim 1 of Hildebrandt recites in part the production of "hydrocarbons according to the overall process mass balance:

$$CO_2 + 3H_2 \Rightarrow CH_2 + 2H_2O,\text{"}\tag{3}$$

which is an equation known to work with iron-based FT catalysts, but not known to work with cobalt-based FT catalysts. See, for example, "Comparative study of Fischer-Tropsch synthesis with $H_2$/CO and $H_2$/$CO_2$ syngas using Fe- and Co-based catalysts," T. Riedel, M. Claeys, H. Schulz, G. Schaub, S. Nam, K. Jun, M. Choi, G. Kishan, K. Lee, in APPLIED CATALYSTS A: GENERAL 186 (1999), pp. 201-213 ("Riedel et al."), which at page 212 concluded, "Fischer-Tropsch $CO_2$ hydrogenation would be possible even in a commercial process with iron, however, not with cobalt catalysts." Hildebrandt does not, however, disclose the FT catalyst or the type of FT catalyst used in the FT process(es) described.

Hildebrandt further notes, "Unreacted carbon dioxide, carbon monoxide and hydrogen may be recirculated from the Fischer Tropsch synthesis section (5) into the gasifier/reforming process stage (3) via a conduit (7) or back to the Fischer Tropsch synthesis section." (Hildebrandt at Col. 3, lines 28-31.)

Accordingly, there are needs in the art for novel systems and methods for producing reformed gas or syngas. Desirably, such systems and methods enable using FT tail gas and FT water to make additional syngas without requiring a saturator or a source of pure oxygen.

SUMMARY

A method of producing Fischer-Tropsch ("FT") hydrocarbons via FT synthesis in an FT reactor having an FT synthesis catalyst is disclosed. The method includes producing a reformed gas comprising hydrogen and carbon monoxide in a syngas preparation unit having a front end and a feed comprising a natural gas and steam, conditioning the reformed gas by removing process condensate therefrom, producing liquid FT hydrocarbons, an FT tail gas and an FT water stream using the conditioned reformed gas in the FT reactor, under FT conditions, superheating at least a first portion of the FT tail gas, injecting at least a first portion of the FT water stream into the superheated at least a first portion of the FT tail gas to form a mixed gas, and recycling the mixed gas as part of the feed to the front end of the syngas preparation unit.

A method of producing reformed gas as part of a Fischer-Tropsch ("FT") hydrocarbons synthesis is disclosed. This method includes superheating at least a first portion of an FT tail gas produced as a by-product of an FT synthesis process, preheating an FT water stream produced as a by-product of the FT synthesis process, forming a mixed gas comprising at least a portion of the FT water stream injected into the superheated FT tail gas, the amount of at least a the portion of the FT water selected to keep the mixed gas entirely in a vapor phase, forming a converted mixed gas by sending the mixed gas through a water-gas shift reactor; adding steam to the converted mixed gas to form a converted feed, and using the converted feed as a feed to a front end of a syngas preparation unit.

Another method disclosed is for producing a syngas to make Fischer-Tropsch ("FT") hydrocarbons via FT synthesis in an FT reactor. The method includes the steps of preheating a sweet natural gas in a natural gas preheater upstream of a steam methane reformer ("SMR"), having an SMR tube with an input and an outlet and containing an SMR catalyst, providing fuel to the SMR through a fuel flowline having a first flow control regulator, producing a syngas comprising hydrogen and carbon monoxide using the SMR, the SMR feed comprising the preheated, sweet natural gas input and steam, sending the syngas through the outlet in the SMR tube to the reformed gas boiler, using water from a steam drum, cooling the syngas in a reformed gas boiler to an intermediate temperature, forming an intermediate temperature syngas, sending the intermediate temperature syngas from the reformed gas boiler to a mixed gas superheater, separately passing the intermediate temperature syngas through the mixed gas superheater, whereby the heat from intermediate temperature syngas superheats a mixed gas stream also passing through the mixed gas superheater without mixing the intermediate temperature syngas with the mixed gas stream, conditioning the syngas which exits the mixed gas superheater, using the conditioned syngas as a feed to the FT reactor, having an FT catalyst and operating under FT conditions, to produce a liquid FT hydrocarbon stream, an FT water stream, and an FT tail gas, generating steam from a boiler feed water in a steam generator and sending the steam via a first steam flowline to the steam drum, sending steam from the steam drum to a steam superheater through a second steam flowline, collecting steam from the reformer gas boiler flowline in the steam drum via a third steam flowline, diverting a first portion of the steam in the second steam flowline upstream of the steam superheater into a fourth steam flowline, leaving a second portion of the steam in the second steam flowline, superheating the second portion of the steam in the steam superheater and conveying superheated steam away from the steam superheater via a fifth steam flowline that has a downstream connection with a sixth steam flowline, the sixth steam flowline having a second flow control regulator downstream of the connection with the fifth steam flowline, the fifth steam flowline having a third flow control regulator downstream of its connection with the sixth steam flowline, diverting a third portion of the steam from the first portion of the steam in the second steam flowline and providing the third portion of the steam via a seventh steam flowline to heat a recycled gas superheater and an FT water preheater, sending the FT tail gas from the FT reactor to the recycled gas superheater, superheating the FT tail gas in the recycled gas superheater using heat from the third portion of the steam conveyed in the seventh steam flowline, adding the preheated sweet natural gas to the superheated FT tail gas to create a feed gas, sending the feed gas to a first gas desuperheater, preheating the FT water in the FT water preheater using heat from the third portion of the steam to a temperature below saturation point, sending the preheated FT water to the first gas desuperheater and directly injecting a first portion of the preheated FT water into the feed gas at the first gas desuperheater to form a mixed gas stream, whereby the first portion of the preheated FT water is in an amount selected to keep the mixed gas stream entirely in the vapor phase, leaving a second portion of the FT water to be conveyed to a second gas desuperheater, superheating the mixed gas stream in a mixed gas superheater, sending the super-heated mixed gas stream to the second gas desuperheater, wherein at least part of the second portion of the FT water is injected directly into the super-heated mixed gas steam, resulting in a second mixed gas stream entirely in the vapor phase, sending the second mixed gas stream to a water-gas shift reactor that converts a portion of the carbon monoxide and water in the second mixed gas stream to carbon dioxide and hydrogen, in order to form a converted mixed gas stream, sending the converted mixed gas steam through a converted steam flowline to a mixed feed preheater coil, adjusting the second flow control regulator and the third flow control regulator to allow a predetermined amount of superheated steam from the fifth steam flowline through the sixth steam flowline and into the converted steam flowline, the sixth steam flowline and the converted steam flowline being connected downstream of second flow control regulator and upstream of the mixed feed preheater coil, the predetermined amount of the superheated steam and the converted mixed gas forming a second mixed feed gas, sending the second mixed feed gas to the mixed feed preheater coil, preheating the second mixed feed gas in the mixed feed preheater coil, sending the preheated second mixed feed gas from the mixed feed preheater coil to and into the SMR tube containing the SMR catalyst, and transforming the preheated second mixed feed gas as a feed to the SMR.

A system for producing a syngas is disclosed. The system includes a superheater for superheating a Fischer-Tropsch ("FT") tail gas produced by an FT reactor and an injector for injecting at least a portion of an FT water stream produced by an FT reactor into the superheated FT tail gas to form a mixed gas. The system includes a syngas preparation unit having a front end. The feeds to the front end comprise the mixed gas, a sweet natural gas and steam. In one or more embodiments, the system includes a water-gas shift reactor, downstream of the injection of the at least a portion of the FT tail gas. The water-gas shift reactor forms a converted mixed gas from the mixed gas. There is included a connection downstream of the water-gas shift reactor and upstream of the front end of the syngas preparation unit by which steam is added to the converted mixed gas to form a converted feed. The converted feed is used as a feed for the front end of the syngas preparation unit.

An apparatus for preparing a Fischer-Tropsch ("FT") tail gas and an FT water, both produced by an FT reactor, for recycling into a front end of a syngas preparation unit is disclosed. The apparatus includes a superheater for superheating the FT tail gas and an injector for injecting at least a portion of the FT water stream into the superheated FT tail gas to form a mixed gas, while keeping the mixed gas in at least a mostly, and preferably an entirely, vapor phase.

These and other embodiments, features and advantages will be apparent in the following detailed description and drawings.

BRIEF DESCRIPTION OF THE DRAWINGS

For a more detailed description of the present invention, reference will now be made to the accompanying drawings, wherein:

FIG. 3B is similar to FIG. 3A, but includes recycling carbon dioxide to the syngas preparation unit and recycling a portion of the FT tail gas to the FT reactor.

NOTATION AND NOMENCLATURE

Figure 1:
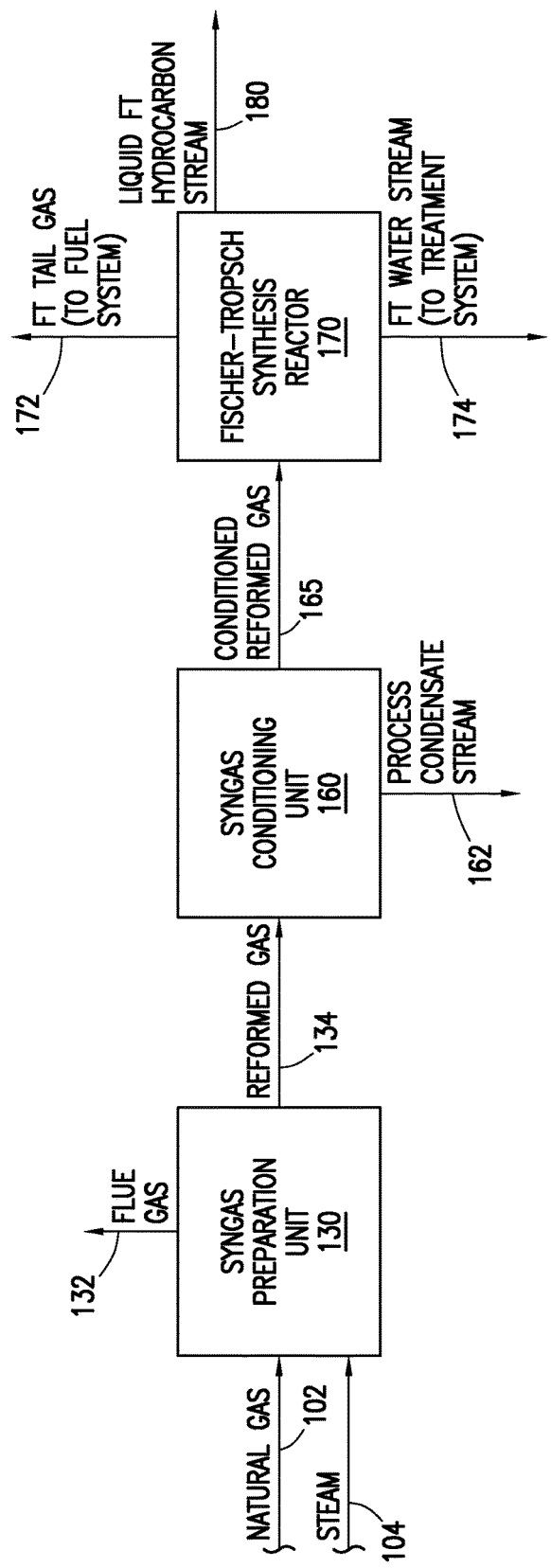
FIG. 1 depicts a simplified block diagram for a conventional Fischer Tropsch system, including a steam methane reformer ("SMR") configuration.
Figure 2:
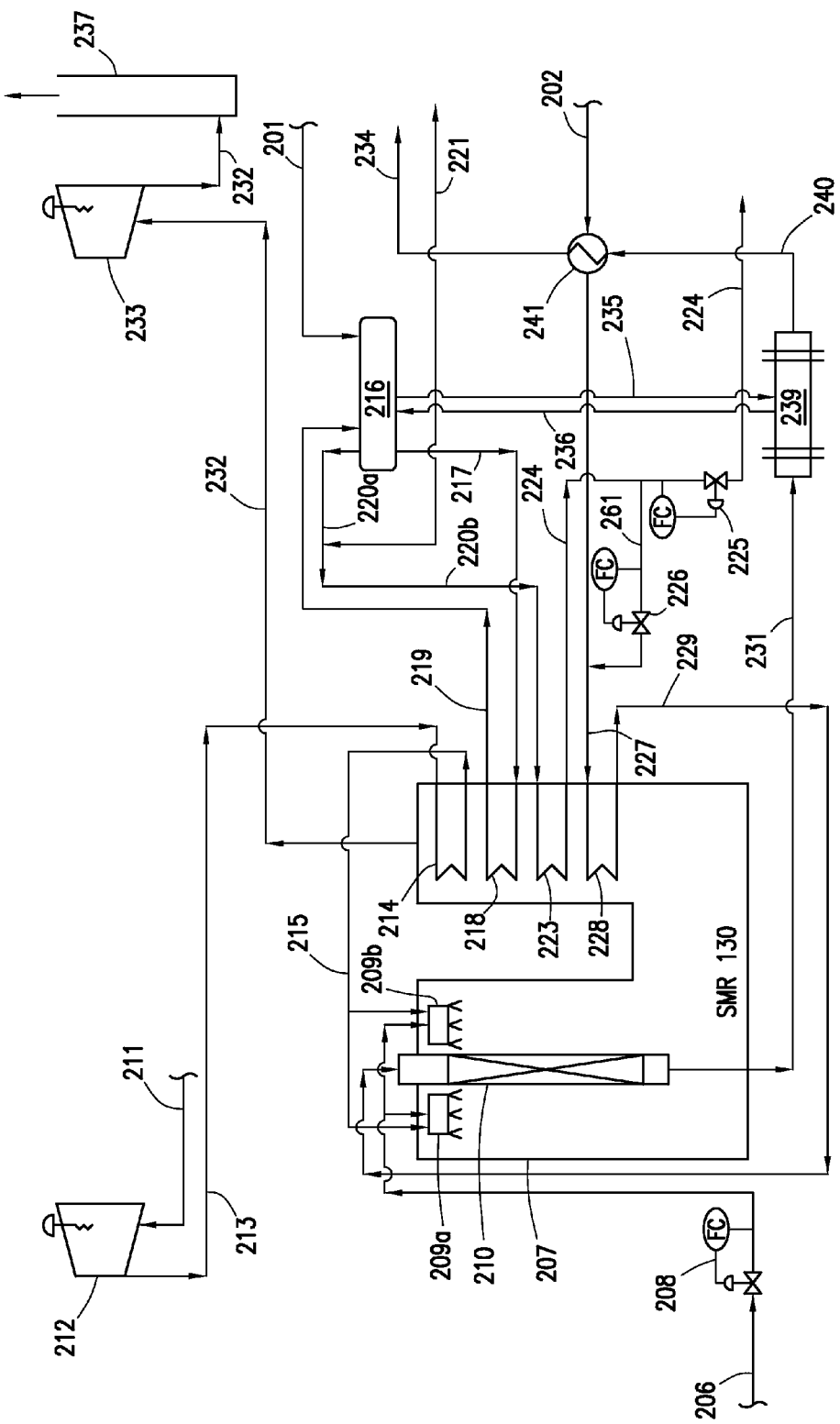
FIG. 2 depicts a more detailed view of the conventional SMR 130 of FIG. 1 and some associated equipment.

As used herein, the term "carbonaceous feedstock" means carbon-containing energy sources such as coal, natural gas, biomass, or carbonaceous waste streams (such as municipal solid or gaseous waste) that can be converted into syngas. Some carbon energy sources must be pre-treated and/or gasified before use as a feedstock to a syngas preparation unit.

As used herein, the abbreviation "FT" and/or "F-T" stand for Fischer-Tropsch (which may also be written "Fischer Tropsch").

As used herein, the term "FT tail gas" means gas produced from an FT reactor. The FT tail gas may typically contain unreacted hydrogen and carbon monoxide, as well as carbon dioxide, some light hydrocarbons, and other light reaction byproducts.

As used herein, the term "FT purge stream" or "FT tail gas purge stream" have an identical meaning and mean excess FT tail gas removed from the primary FT tail gas stream. The FT purge stream typically has the same composition as the FT tail gas.

As used herein, the term "FT water" means water produced by an FT reaction. The FT water will typically include dissolved oxygenated species, such as alcohols, and light hydrocarbons.

As used herein, with respect to an FT plant, (1) the abbreviation "GTL" stands for gas-to-liquids; (2) the abbreviation "CTL" stands for coal-to-liquids; (3) the abbreviation "BTL" stands for biomass-to-liquids; and (4) the abbreviation "WTL" stands for waste-to-liquids. The first letter of each abbreviation stands for the respective carbonaceous feedstock used to create syngas that is used as a feed to an FT reactor to make liquid FT products. Thus, for example, GTL plants use natural gas to make the syngas used as a feed for the FT reactor.

As used herein, the phrase "a high-temperature Fischer-Tropsch (or 'HTFT') reactor" means an FT reactor that is typically operated at temperatures of 330° C.-350° C., which typically employs an iron-based catalyst. This process has been put to use extensively by Sasol in their Coal-to-Liquid (CTL) plants. As used herein, the phrase "a low-temperature Fischer-Tropsch (or 'LTFT') reactor" means an FT reactor that is operated at lower temperatures, generally in a range between 170° C.-235° C., which typically employs a cobalt-based catalyst. As used herein, the phrase "a low-temperature, high-pressure Fischer-Tropsch (or 'LTHP FT') reactor" means an LTFT reactor that is operated at high pressures, such as between 300 psig and 600 psig.

As used herein, the term "liquid FT hydrocarbon products" means liquid hydrocarbons produced by an FT reactor.

As used herein, the terms "reformed gas," "synthesis gas," or "syngas" means the effluent from a syngas preparation unit, such as (without limitation) a steam methane reformer, autothermal reformer, hybrid reformer, or partial oxidation reformer. Steam methane reformers do not use oxygen as part of the process; autothermal reformers do. Both use reformer catalysts. Hybrid reformers are a combination of steam methane reforming, as a first step, and an autothermal reforming with oxidation as a second step. Partial oxidation reformers are similar to autothermal reformers, but do not include the use of a reformer catalyst.

As used herein, the term "sweet natural gas" means natural gas from which any excess sulfur or sulfur compounds, such as for example $H_2S$, has been previously removed.

As used herein, the term "to superheat" a fluid means to heat the fluid above its steam dew point (or saturation point). Specific preferred temperature ranges are noted, although other temperatures typically may be used.

As used herein, the term "tubular reactor" refers to Fischer-Tropsch reactors containing one or more tubes containing FT catalyst, wherein the inner diameter or average width of the one or more tubes is typically greater than about 0.5".

Use of the term "tubular" is not meant to be limiting to a specific cross sectional shape. For example, tubes may have a cross-sectional shape that is not circular. Accordingly, the tubes of a tubular reactor may, in one or more embodiments, have a circular, oval, rectangular, and/or other cross sectional shape(s).

As used herein and as mentioned above, the abbreviation "WGS" stands for water gas shift and the abbreviation "WGSR" stands for water-gas-shift reaction.

DETAILED DESCRIPTION

Figure 3A:
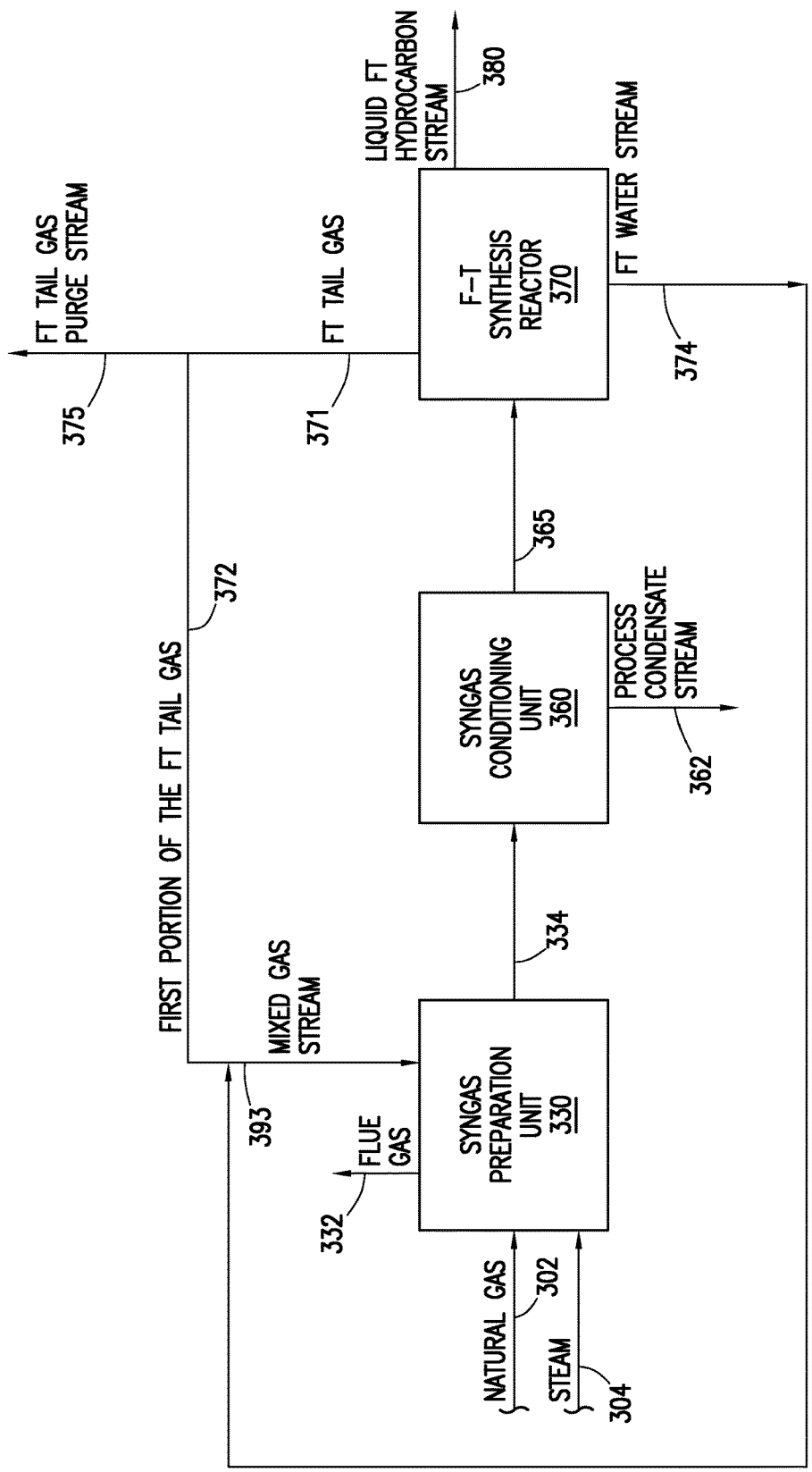
FIG. 3A and FIG. 3B depict flow diagrams for a Fischer Tropsch system, including a steam methane reformer ("SMR") configuration, in accordance with one or more embodiments of the present disclosure.
Figure 3B:
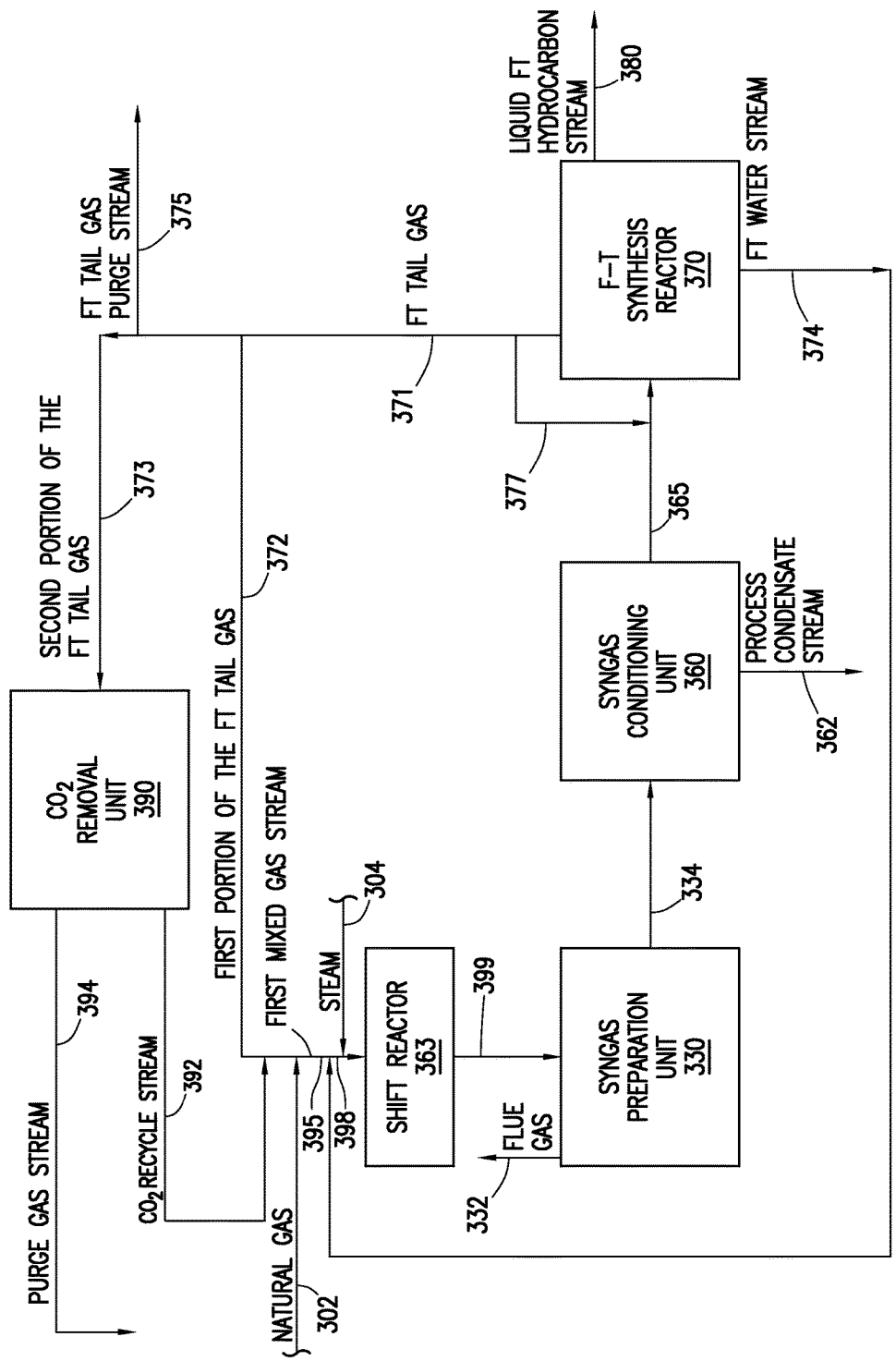

FIG. 3A depicts a simplified flow diagram for a Fischer Tropsch system in accordance with one or more embodiments of the present disclosure. Natural gas 302 and steam 304 feed into a front end of a syngas preparation unit 330. In alternate embodiments, one or more other carbonaceous feedstocks may be used instead of or in addition to the natural gas 302. The syngas preparation unit 330 may comprise, for example, an SMR, an autothermal reformer, a hybrid reformer, or a partial oxidation reformer. As is known in the art, different types of syngas preparation units have different requirements and may be configured differently. Fox example, an autothermal syngas preparation unit would require an oxygen source, which is not depicted on FIG. 3A. The natural gas 302 entering the syngas preparation unit 330 is preferably sweet natural gas, from which any excess sulfur or sulfur compounds such as $H_2S$ has been previously removed. In one or more alternative embodiments, a naphtha stream or other light hydrocarbon stream might be substituted for, or added to, the natural gas 302 as a feed for the syngas preparation unit 330. A flue gas 332 and a reformed gas (or "syngas") 334 exit the syngas preparation unit 330 via a first flowline and a second flowline respectively. (Flowlines in FIG. 3A and FIG. 3B are not numbered separately from the fluids contained therein.) The syngas 334 passes to a syngas conditioning unit 360, whereby a process condensate stream 362 is collected and the hydrogen and carbon monoxide ratios are adjusted to pre-determined levels, if needed. A conditioned syngas stream 365 is sent via a third flowline to an FT synthesis reactor 370 (or "FT reactor") having an FT catalyst, as a feed for use in creating FT hydrocarbons. The FT reactor 370 includes an FT catalyst and operates under FT conditions, which may vary somewhat depending on the type of FT reactor used. The FT reactor produces liquid FT hydrocarbons 380, with byproducts including an FT tail gas 371, and an FT water stream 374.

In one or more embodiments, the FT reactor 370 comprises a fixed bed Fischer-Tropsch reactor. In one or more embodiments, the FT reactor 370 comprises a tubular Fischer-Tropsch reactor. In one or more embodiments, the FT reactor 370 comprises a fluidized bed Fischer-Tropsch reactor. In one or more embodiments, the FT reactor 370 comprises a slurry bed Fischer-Tropsch reactor, such as, but not limited to, a slurry bubble column Fischer-Tropsch reactor. In one or more embodiments, the FT reactor 370 comprises an FT reactor of any type.

The disclosed FT reactor 370 of FIG. 1 and system and method used therewith may employ one or more of a variety of FT catalytic metals, such as Group 8-10 metals, including, but not limited to, iron, nickel, ruthenium, and/or cobalt. As discussed further herein below, in one or more embodiments of the present disclosure, cobalt-based catalysts may be employed. As known in the art, a cobalt-based FT catalyst may comprise cobalt impregnated into or onto any convenient catalyst carrier or support material, including, but not limited to, alumina ($Al_2O_3$), titania ($TiO_2$), and silica ($SiO_2$). Exotic carriers and promoters, such as platinum (Pt), palladium (Pd), rhenium (Re), and ruthenium (Ru) may also be employed. Other suitable catalyst carrier(s) and promoter(s) are known in the art and may be incorporated. The FT catalyst carrier may be in any convenient shape (e.g., spheres, pellets, trilobes, etc.).

The FT tail gas 371 typically includes light hydrocarbons, as well as unreacted hydrogen, unreacted carbon monoxide, carbon dioxide, and other light reaction byproducts. At least a first portion 372 of the FT tail gas is sent via a fourth flowline as a feed to the syngas preparation unit 330. A fifth flowline carries the FT water stream 374 to the fourth flowline, where at least a part of the FT water stream 374 is injected into the first portion of the FT tail gas 372 using an injector (not separately depicted in FIG. 3A) upstream of the syngas preparation unit 330 to form a mixed gas stream 393. The amount of the at least a part of the FT water stream 374 to be injected into the first portion of the FT tail gas 372 is preferably selected so as to keep the mixed gas stream 393 entirely in the vapor phase. The injector preferably comprises a gas desuperheater, although in some applications other injectors, and even a simple injector, such as a spray nozzle or a T-connection, might suffice. Although a single point of injection is depicted in FIG. 3A, in one or more embodiments of the present disclosure there may be one or more additional injection points at which portions of the FT water are injected into the mixed gas stream 393. Preferably, at each injection point, an amount of FT water injected at that injection point is selected to keep the mixed gas stream 393 entirely in the vapor phase.

If the mixed gas stream 393 is not entirely in a vapor phase, residual water may cause corrosion or problems with downstream catalysts. However, in one or more alternate embodiments of the present disclosure, the FT water stream 374 is injected into the first portion of the FT tail gas 372, without allowing FT hydrocarbons in the FT tail gas 372 to condense, but so that the mixed gas stream 393 is not entirely in the vapor phase. In one or more embodiments, the mixed gas stream 393 is mostly in the vapor phase. In one or more embodiments, the mixed gas stream 393 is at least 75% vapor by weight. In one or such alternative embodiments, excess water may be removed from the mixed gas stream 393, for example, by use of a separator drum or other separation device.

Referring back to FIG. 3A, the mixed gas stream 393 is added as a feed to the front end of the syngas preparation unit 330. In one or more alternate embodiments of the present disclosure, the natural gas 302 and/or carbon dioxide is added to the first portion of the FT tail gas 372, preferably upstream of the location where the FT water 374 is injected into the first portion of the FT tail gas 372, so that the FT water stream 374 (or one or more portions thereof) is injected into a combination of the natural gas 302 and/or carbon dioxide and the first portion of the FT tail gas 372.

Continuing to refer to FIG. 3A, excess FT tail gas is removed from the FT tail gas 371 as an FT tail gas purge stream 375, carried by a sixth flowline. The FT tail gas purge stream 375 may contain hydrogen and may be used for fuel for the steam methane reformer 330 or for other plant purposes. Alternatively, the FT tail gas purge stream 375 may be treated to separate out carbon dioxide for recycling, as described in the previously mentioned and U.S. Provisional Application No. 62/005,118.

FIG. 3B is similar to FIG. 3A, but includes sending a second portion of the FT tail gas to a $CO_2$ removal unit and recycling carbon dioxide removed therefrom to the syngas preparation unit. FIG. 3B also includes an addition of a water-gas shift reactor 363 upstream of a syngas preparation unit 330 and recycling a third portion of the FT tail gas to the FT reactor.

As with FIG. 3A, in FIG. 3B, natural gas 302 and steam 304 feed into a front end of the syngas preparation unit 330. The syngas preparation unit 330 may comprise, for example, an SMR, an autothermal reformer, a hybrid reformer, or a partial oxidation reformer. The natural gas 302 entering the syngas preparation unit 330 is preferably sweet natural gas, from which any excess sulfur or sulfur compounds such as $H_2S$ has been previously removed. In one or more alternative embodiments, a naphtha stream or other light hydrocarbon stream might be substituted for, or added to, the natural gas 302 as a feed for the front end of the syngas preparation unit 330. A flue gas 332 and a reformed gas (or "syngas") 334 exit the syngas preparation unit 330 via a first flowline and a second flowline respectively. The syngas 334 passes to a syngas conditioning unit 360, whereby a process condensate stream 362 is collected and the hydrogen and carbon monoxide ratios are adjusted to pre-determined levels, if needed. A conditioned syngas stream 365 is sent via a third flowline to an FT synthesis reactor 370 having an FT catalyst, for FT processing under FT conditions. Outputs for the FT reactor 370 during production operations include an FT tail gas 371, an FT water stream 374, and a liquid FT hydrocarbon stream 380. The FT tail gas 371 typically includes light hydrocarbons, as well as unreacted hydrogen, unreacted carbon monoxide, carbon dioxide, and other light reaction byproducts, such as olefins. At least a first portion 372 of the FT tail gas 371 is sent via a fourth flowline to the front end of the syngas preparation unit 330, via a water gas shift reactor 363.

As with FIG. 3A, in FIG. 3B, excess FT tail gas is removed from the FT tail gas 371 as an FT tail gas purge stream 375 carried by a sixth flowline. The FT tail gas purge stream 375 may contain hydrogen and may be used for fuel for the steam methane reformer 330 or for other plant purposes. Alternatively, the FT tail gas purge stream 375 may be treated to separate out carbon dioxide for recycling, as described in U.S. Provisional Application No. 62/005,118 entitled "Systems, Methods and Apparatuses for Utilizing a Fischer-Tropsch Purge Stream."

Continuing to refer to FIG. 3B, a second portion 373 of the FT tail gas 371 may be sent via a seventh flowline to a CO₂ removal unit 390. The CO₂ removal unit 390 recovers carbon dioxide from the second portion 373 of the FT tail gas 371. The CO₂ removal unit 390 output also includes a purge gas stream 394, carried by an eighth flowline. The purge gas stream 394 may contain hydrogen and may be used for fuel for the steam methane reformer 330 or for other plant purposes. The carbon dioxide recovered by the CO₂ removal unit 390 may be sequestered or may be otherwise properly disposed of. Alternatively, as depicted in FIG. 3B, the carbon dioxide recovered by the CO₂ removal unit 390 may be recycled as a CO₂ recycle stream 392 to the syngas preparation unit, either separately or, as depicted in FIG. 3B, together with the first portion 372 of the FT tail gas. In embodiments wherein the syngas preparation unit 330 comprises a steam methane reformer, additional CO₂ in the feed to the steam methane reformer is believed to suppress the formation in the steam methane reformer of undesirable excess hydrogen by facilitating the reverse shift reaction:

$$CO_2 + H_2 \Longleftrightarrow CO + H_2O. \qquad (4)$$

Accordingly, provision of additional CO₂ to a steam methane reformer, for example through recycling of CO₂, may be beneficial.

Referring again to FIG. 3B, a third portion 377 of the FT tail gas is removed and recycled as a feed to the FT reactor. The third portion 377 of the FT tail gas may be added as a separate input to the FT reactor or, as depicted in FIG. 3B, may be combined with the conditioned syngas stream 365.

In FIG. 3B, the first portion 372 of the FT tail gas, the CO₂ recycle stream 392 and the natural gas 302 are combined to form a first mixed gas stream 395. The FT water stream 374 and the steam 304 are injected into the first mixed gas stream 395, to form a second mixed gas stream 398. The second mixed gas stream 398 passes through the water-gas shift reactor 363 to reduce levels of carbon monoxide and olefins in the second mixed gas stream 398. If the combination of levels of carbon monoxide and olefins present in the feed to the syngas preparation unit 330 is sufficiently high, undesirable coking may result. The FT tail gas may contribute to the levels of carbon monoxide and olefins. The water-gas shift reactor 363 converts the carbon monoxide and water in the second mixed gas stream 398 to carbon dioxide and hydrogen, in order to form a converted mixed gas stream 399. The converted mixed gas stream 399 is used as a feed for the front end of the syngas preparation unit 330.

In one or more alternative embodiments, instead of using the water-gas shift reactor 363, the amount of steam 304 added to the first mixed gas stream 395 may be increased to offset the levels of carbon monoxide and olefins present. However, the amount of steam 304 that can be used may be limited by the capacity of the syngas preparation unit 330. In one or more alternative embodiments, the water-gas shift reactor 363 may be positioned to be used on the first portion 372 of the FT tail gas, upstream of the locations where the CO₂ recycle stream 392, the natural gas 302, the FT water stream 374 or the steam 304 are added to the first portion 372 of the FT tail gas. If the shift reaction is performed on the first portion 372 of the FT tail gas alone, additional steam and one or more additional water-gas shift reactors might be required, likely with a cooling step performed between the water-gas shift reactors.

Figure 4:
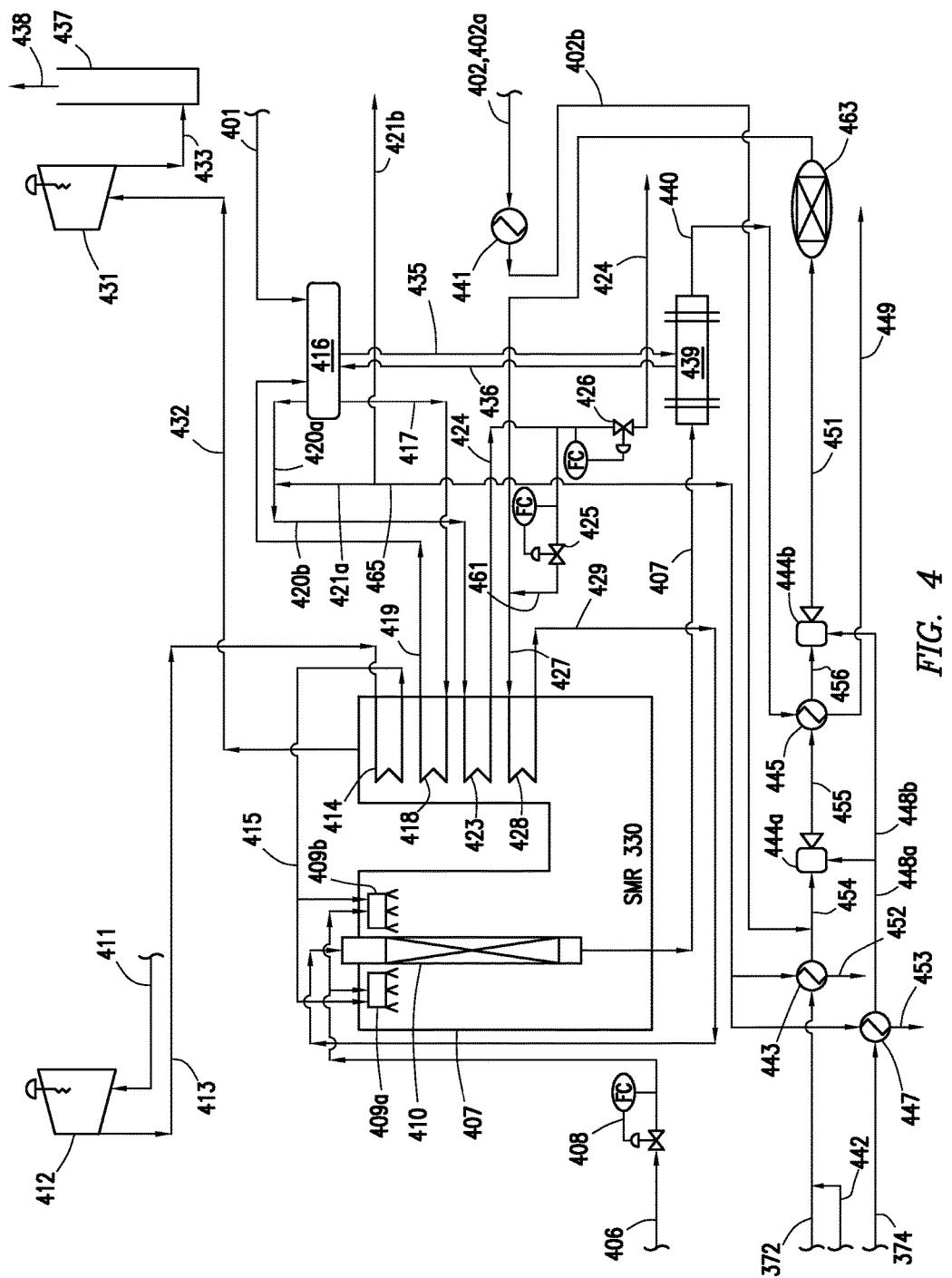
FIG. 4 depicts a more detailed view of the SMR of FIG. 3B and some associated equipment, in accordance with one or more embodiments of the present disclosure.

FIG. 4 depicts a more detailed view of one or more embodiments of the syngas preparation unit 330 of FIG. 3B, in accordance with the present disclosure, which in FIG. 4 comprises a steam methane reformer ("SMR"). A fuel gas flowline 406 conveying a fuel gas passes through a first flow control 408 and then to a first burner 409*a* and a second burner 409*b* of the SMR 330. (In other embodiments, there may be a single burner or more than two burners.) A first combustion air flowline 411 carries combustion air to a forced draft fan 412. A second combustion air flowline 413 conveys the combustion air from the forced draft fan 412 to a combustion air heater 414, which heats the combustion air. The heated combustion air passes via a third combustion air flowline 415 to the first and second burners 409*a*, 409*b*, where the heated combustion air is mixed with the fuel gas and the fuel gas is burned. The SMR 330 preferably contains the combustion air heater 414, a steam generator 418, a steam superheater 423, and a mixed feed preheater coil 428.

Referring again to FIG. 4, a boiler feed water line 401 conveys a boiler feed water stream to a steam drum 416. A first water line 435 conveys water from the steam drum 416 to a reformed gas boiler 439, via natural circulation. A second water line 417 conveys water from the steam drum 416 to the steam generator 418 that coverts the water to steam. A first steam flowline 419 conveys the steam to the steam drum 416. Steam leaves the steam drum 416 via a second steam flowline 420*a*, 420*b*. In FIG. 4, the second steam flowline 420*a* is connected to a fourth steam flowline 421*a*. (Upstream of connection to the fourth steam flowline 421*a*, the second steam flowline is designated as 420*a* in FIG. 4, while downstream the second steam flowline is designated 420*b*.) A steam-water mixture is returned to the steam drum 416 from the reformed gas boiler 439 via natural circulation in a third steam flowline 436.

Referring again to FIG. 4, a first portion of the steam in the second steam flowline 420*a* is diverted through the fourth steam flowline 421*a*. Downstream of the diversion, the second steam flowline 420*b* carries a second portion of the steam to the steam superheater 423. The steam superheater 423 preferably heats the second portion of the steam to very high temperatures. For example, if the second portion of the steam leaving the steam drum 416 in the second steam flowline 420*a* was at a temperature of about 450° F., then the steam superheater 423 may typically heat the second portion of the steam to a temperature of about 700° F., so that it becomes a superheated steam. The superheated steam leaves the steam superheater 423 via a fifth steam flowline 424. The fifth steam flowline 424 is connected to a sixth steam flowline 461, which has a second flow control regulator 425 that is downstream of the sixth steam flowline's 461 connection with the fifth steam flowline 424 and upstream of the sixth steam flowline's 461 connection with a converted stream flowline 427, discussed in further detail below. Downstream of its connection with the sixth steam flowline 461, the fifth steam flowline 424 is connected to a third flow control regulator 426 by which excess superheated steam can be sent to a turbine or to other parts of the plant. The fourth steam flowline 421*a*, 421*b* is connected to a seventh steam flowline 465, with the portion of the fourth stream flowline upstream of that connection designated as 421*a* and the portion of the fourth stream flowline downstream of that connection designated as 421*b*. Regarding the steam diverted through the fourth steam flowline 421*a*, a third portion of the steam may be diverted through the seventh steam flowline 465, which carries steam to provide heat to a recycled gas superheater 443 and an FT water preheater 447. A fourth portion of the steam, that is, the portion of the steam in the fourth steam flowline 421*b* that was not diverted through the seventh steam flowline 465, may be sent to a turbine or other parts of the plant (not depicted in FIG. 4).

Continuing to refer to FIG. 4, a first FT tail gas flowline 372 conveys at least a first portion of an FT tail gas from the FT reactor (not depicted in FIG. 4) to the recycled gas superheater 443. The first portion of the FT tail gas may be mixed with other gas recycle streams brought in by a gas recycle line 442, which may be connected to the first FT tail gas flowline 372 as depicted in FIG. 4. The other gas recycle streams may include, for example, carbon dioxide ($CO_2$). The recycled gas superheater 443 heats the FT tail gas (and other recycled gas, if any) above the steam dew point to a temperature of about 400° F. using steam from the seventh steam flowline 465. A first high-pressure steam condensate exits the recycled gas superheater 443 through a first high pressure condensate line 452. The first high-pressure steam condensate may be recycled to make steam. The superheated FT tail gas (and other recycled gas, if any) exits the recycled gas superheater 443 through a first mixed gas flowline 454.

Referring again to FIG. 4, a first segment 402a of a natural gas flowline 402 conveys natural gas to a natural gas preheater 441, which preheats the natural gas to a temperature of about 400° F. The natural gas in the first segment 402a of the natural gas flowline 402 is preferably sweet natural gas, from which excess sulfur or sulfur compounds such as hydrogen sulfide ($H_2S$) have been previously removed. The preheated natural gas is conveyed from the natural gas preheater 441 through a second segment 402b of the natural gas flowline 402 to connect with the first mixed gas flowline 454, wherein the preheated natural gas mixes with the superheated FT tail gas (and other recycled gas, if any) coming from the recycled gas superheater 443 to form a feed gas. The first mixed gas flowline 454 carries the feed gas to a first gas desuperheater 444a.

Again referring to FIG. 4, an FT water stream is produced from cooling and partial condensing of an effluent from an output of an FT reactor (not depicted in FIG. 4). The FT water stream is conveyed through a first FT water flowline 374 to the FT water preheater 447. The FT water preheater 447 preheats the FT water stream to a temperature below saturation point (about 430° F.) using the steam from the seventh steam flowline 465. A second high pressure steam condensate exits the FT water preheater 447 through a second high pressure condensate line 453. As with the first high pressure steam condensate, the second high pressure steam condensate may be recycled to make steam. A second FT water flowline 448a, 448b conveys the preheated FT water stream to the first gas desuperheater 444a and to a second gas desuperheater 444b. At the first gas desuperheater 444a, a pre-determined portion of the preheated FT water stream is injected from the second FT water flowline 448a directly into the feed gas to form a mixed gas stream. The amount of the pre-determined portion of the preheated FT water stream to be so injected is preferably selected to keep the mixed gas stream entirely in the vapor phase, leaving a remaining portion of the FT water stream to be conveyed via the second FT water flowline 448b to the second gas desuperheater 444b. (In alternate embodiments, there may be more than two gas desuperheaters that each inject a portion of the FT water stream into the feed gas/mixed gas water stream.) A second mixed gas flowline 455 conveys the mixed gas stream to the mixed gas superheater 445, which superheats the mixed gas stream using heat of a syngas in a second reformed gas flowline 440. A third mixed gas flowline 456 conveys the superheated mixed gas stream to the second gas desuperheater 444b, where the second portion of the FT water stream is injected directly into the superheated mixed gas stream, resulting in a second mixed gas stream. In various embodiments, the second mixed gas stream is also entirely in the vapor phase and may include carbon monoxide and water. A fourth mixed gas flowline 451 conveys the second mixed gas stream to a water-gas shift reactor 463. The water-gas shift reactor 463 converts carbon monoxide and the water in the second mixed gas stream to carbon dioxide and hydrogen, in order to form a converted mixed gas stream. Preferably, the concentration of the carbon monoxide in the converted mixed gas stream should be low, such as less than 0.1% volume on a dry basis.

Continuing to refer to FIG. 4, the converted stream flowline 427 conveys the converted mixed gas stream from the water-gas shift reactor 463 to the mixed feed preheater coil 428. The second and third flow control regulators 425, 426 may be adjusted to allow a predetermined amount of superheated steam from the fifth steam flowline 424 through the sixth steam flowline 461 and into the converted stream flowline 427. Thus, a mixture of the steam and the converted mixed gas stream is conveyed as a mixed feed gas through the mixed feed preheater coil 428 where the mixed feed gas is preheated. The preheated mixed feed gas is sent from the mixed feed preheater coil 428 through a mixed feed gas flowline 429 to an input (not separately depicted) of an steam methane reformer ("SMR") tube 410. The SMR tube 410 contains a steam methane reformer catalyst (not separately depicted). The steam methane reformer catalyst may be selected from a variety of commercially materials including but not limited to those commercially available from Clariant, Johnson-Matthey, and Haldor Topsøe. Some examples include Johnson Matthey Katalco® 25-4Q, Johnson Matthey Katalco® 23-4Q, Clariant Reformax® 210 LDP, and Clariant Reformax® 330 LDP. Exposed to high temperatures from the first and second burners 409a, 409b and to the steam methane reformer catalyst, the mixed feed gas becomes the syngas.

Continuing to refer to FIG. 4, a flue gas preferably exits the SMR 330 via a first flue gas flowline 432 to an induced draft fan 431 and from the induced draft fan 431 through a second flue gas flowline 433 to a flue gas stack 437, which has a discharge 438. In alternate embodiments, the flue gas may, if permissible, exit directly from the induced draft fan 431 or through a stub gas stack. The syngas exits the SMR tube 410 via a reformed gas flowline 407 and may be at very high temperatures, with a temperature of about 1600° F. as a typical value. The reformed gas flowline 407 conveys the syngas from the SMR tube 410 to the reformed gas boiler 439. The reformed gas boiler 439 cools the syngas to an intermediate temperature, for example down to about 800° F., to form an intermediate temperature syngas. The second reformed gas flowline 440 conveys the intermediate temperature syngas from the reformed gas boiler 439 to the mixed gas superheater 445. The intermediate temperature syngas is passed through the mixed gas superheater 445, separately from the second mixed gas stream, with the heat from the intermediate temperature syngas being used to heat the second mixed gas stream. The intermediate temperature syngas passes from the mixed gas superheater 445 through a third reformed gas flowline 449 to optional further cooling and/or conditioning treatment and to the FT reactor (not depicted in FIG. 4).

Figure 5:
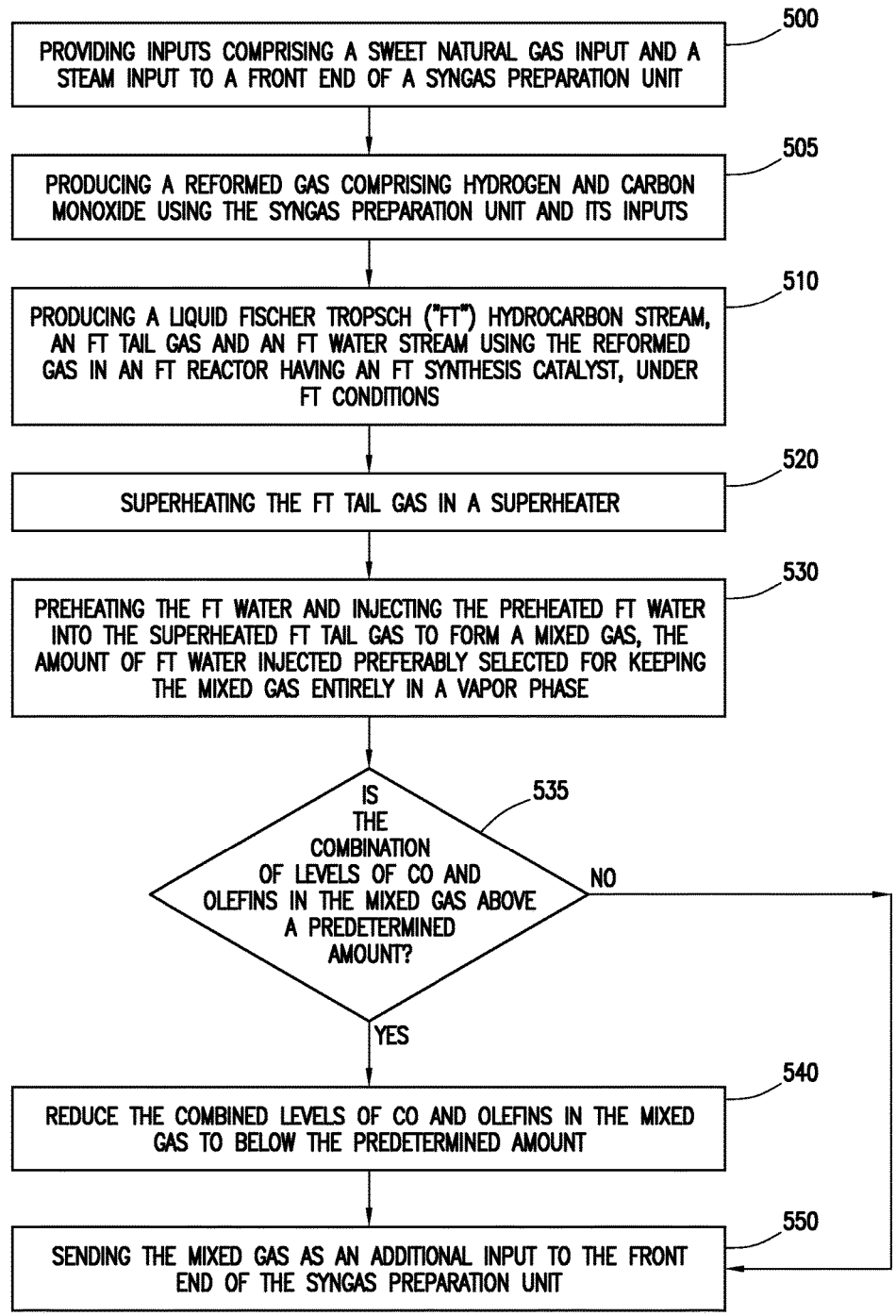
FIG. 5 is a flowchart for a process, in accordance with one or more embodiments of the present disclosure.

FIG. 5 is a flowchart for a process, in accordance with one or more embodiments of the present disclosure. In step 500, initially, inputs of a sweet natural gas and steam are provided to a front end of a syngas preparation unit. A reformed gas, or syngas, comprising hydrogen and carbon monoxide is produced in step 505 using the syngas preparation unit and its inputs. Using the reformed gas in a Fischer Tropsch ("FT") reactor having an FT catalyst under FT conditions, a liquid FT hydrocarbon stream, an FT tail gas and an FT water stream are produced 510. (The FT tail gas and the FT water stream are produced as by-products.) The FT tail gas is superheated 520 in a superheater. The FT water stream is preheated and injected 530 into the superheated FT tail gas to form a mixed gas. The amount of preheated FT water injected is preferably selected to keep the mixed gas entirely in a vapor phase.

In some embodiments, the combination of levels of carbon monoxide and olefins in the mixed gas may be 535 above a predetermined amount. The predetermined amount comprises an amount that might contribute to undesirable coking in the syngas preparation unit. In such a case, the combined levels of the carbon monoxide and olefins in the mixed gas are reduced 540 to below the predetermined amount, for example, by use of a water-gas shift reactor. In alternate embodiments, the combination of levels of carbon monoxide and olefins in the mixed gas may be offset through an increase in the amount of the steam added to the mixed gas as a feed to the front end of the syngas preparation unit.

Referring again to FIG. 5, the mixed gas is sent 550 as an additional input (or feed) to the front end of the syngas preparation unit. Step 500 follows step 550, with the mixed gas being added as an additional input, along with the previously mentioned sweet natural gas and the steam, to the front end of the syngas preparation unit. Once begun, the process steps are continuous and may run twenty-four hours a day for years, until the reactors are shut down for maintenance or other reasons.

In alternate embodiments, the FT tail gas is combined with the sweet natural gas upstream of being superheated and upstream of the injection of the FT water stream. The mixture of sweet natural gas and FT tail gas would be superheated and at least a portion of the FT water injected into the superheated mixture of sweet natural gas and FT tail gas. In alternate embodiments, carbon dioxide is added to the FT tail gas (with or without the previously mentioned addition of the sweet natural gas) upstream of where the FT tail gas (with the added carbon dioxide) is superheated. In such embodiments, the FT water may be injected into the superheated carbon dioxide and FT tail gas mixture (with or without the previously mentioned addition of the sweet natural gas). In alternate embodiments, portions of the FT water stream are injected into the superheated FT tail gas (with or without the additions of carbon dioxide and/or sweet natural gas) in two or more stages. By using additional injection stages, more of the FT water stream may be injected into the FT tail gas (with or without the sweet natural gas and/or carbon dioxide) while preferably keeping the mixed gas entirely in a vapor phase. In many cases, 100% of the FT water may be so injected, so that other disposal alternatives are not required.

Figure 6A:
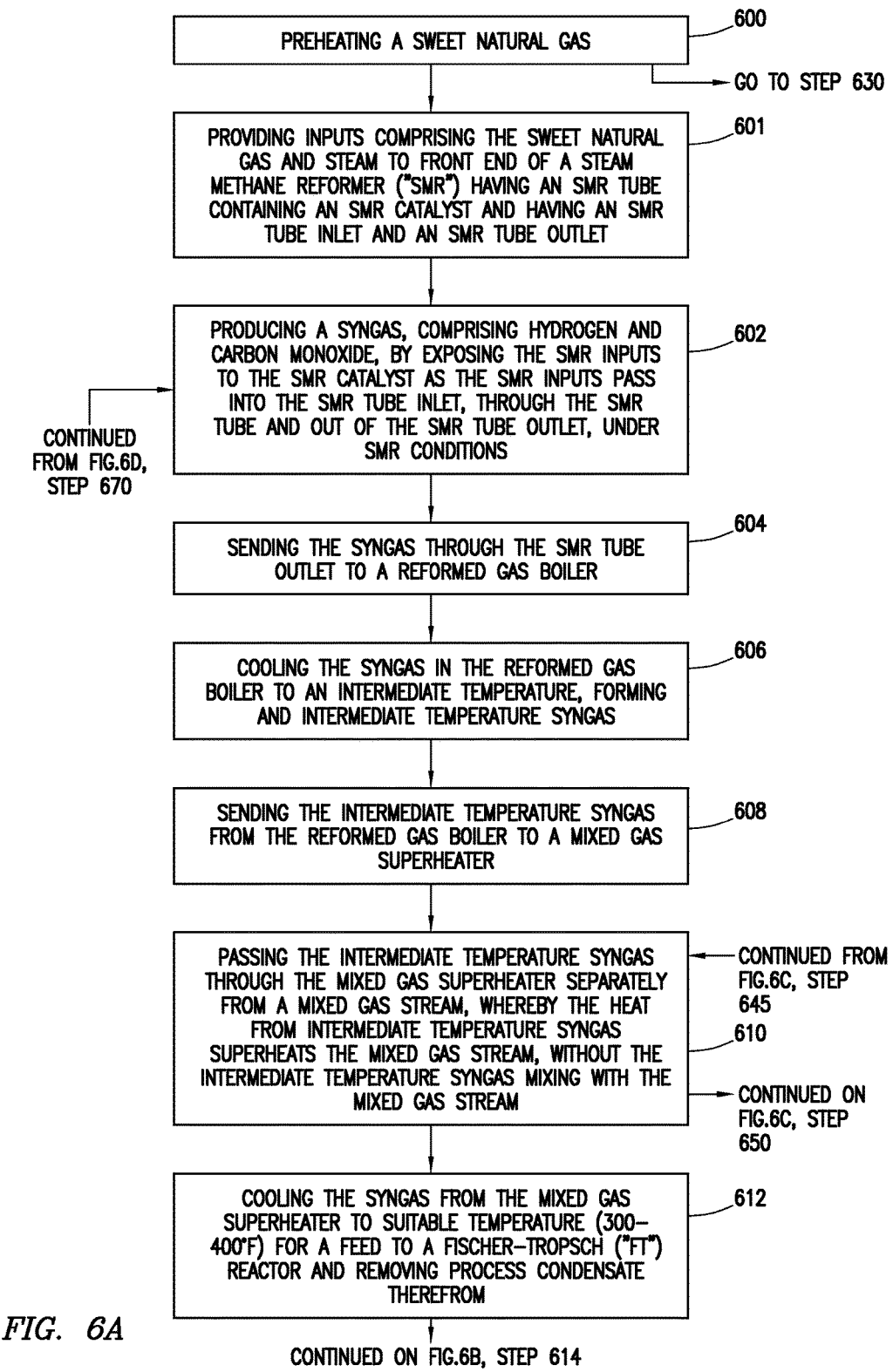
FIGS. 6A and 6B are two parts of a detailed flowchart for a process, in accordance with one or more embodiments of the present disclosure.
Figure 6B:
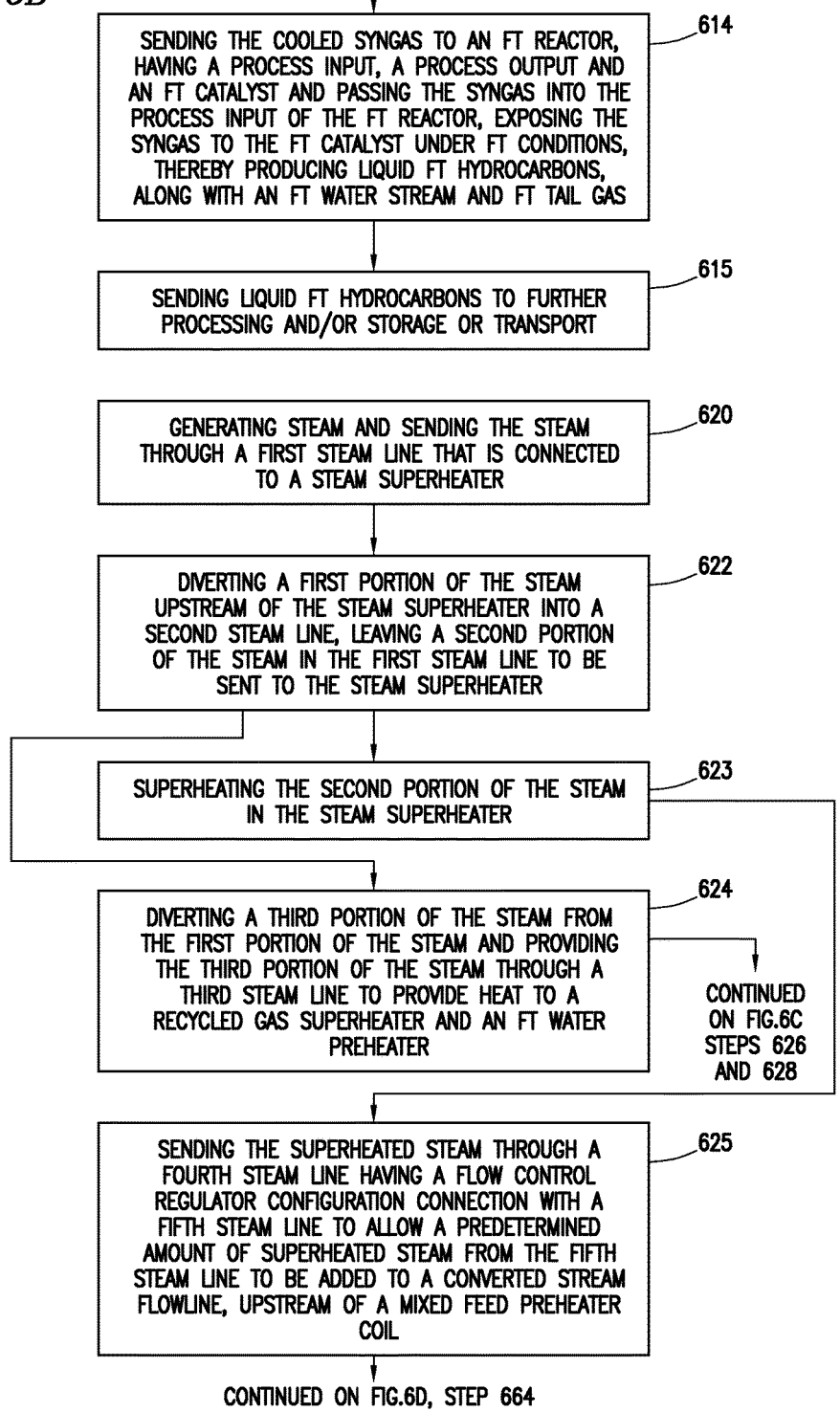

FIGS. 6A and 6B are two parts of a flowchart for a process, in accordance with one or more embodiments of the present disclosure. Referring first to FIG. 6A, in step 600, a sweet gas is preheated. Both steps 601 and step 630 follow step 600. Step 630 is discussed below. In step 601, inputs comprising a sweet natural gas and steam are provided to a front end of a steam methane reformer ("SMR"). The SMR includes an SMR tube that contains an SMR catalyst and has an SMR tube input and an SMR tube outlet. In step 602, a reformed gas (or syngas) is produced by exposing the SMR inputs to the SMR catalyst as the SMR inputs pass into the SMR tube inlet, through the SMR tube and out the SMR tube outlet, under SMR conditions. The syngas includes hydrogen and carbon monoxide. To create the SMR conditions, the SMR may be heated, for example, by preheated combustion air and a fuel gas combusted in one or more burners.

In step 604, the syngas is sent to through the SMR tube outlet to a reformed gas boiler. The syngas is cooled in the reformed gas boiler to an intermediate temperature, forming an intermediate temperature syngas, in step 606. In step 608, the intermediate temperature syngas is sent from the reformed gas boiler to a mixed gas superheater. Step 610 includes passing the intermediate temperature syngas through the mixed gas superheater separately from a mixed gas steam (described further below). Heat from intermediate temperature syngas superheats the mixed gas stream, without the intermediate temperature syngas mixing with the mixed gas stream. Steps 612 and 650 both proceed from step 610. Step 650 is described below. Turning now to step 612, the syngas is cooled to a temperature (such as 300-400° F.) suitable for a feed to a Fischer-Tropsch ("FT") reactor and process condensate is removed. Although not depicted in FIG. 6A, in one or more embodiments, the syngas is conditioned before being sent to the FT reactor. The conditioning may include adjusting the ratio of hydrogen to carbon monoxide and/or removing carbon dioxide from the syngas. Alternately, carbon dioxide may be left in the syngas and used as part of the feed to the FT reactor. The FT reactor includes a process inlet, a process outlet and an FT catalyst. During production operations, the FT reactor operates under FT conditions. The FT conditions may vary somewhat, as known in the art, depending on what type of FT reactor and FT catalyst are used. In step 614, the syngas passes into the process input of the FT reactor, is exposed to the FT catalyst under the FT conditions, thereby producing liquid FT hydrocarbons. The liquid FT hydrocarbons are sent 615 to further processing and/or storage. An FT water stream and FT tail gas are also produced as part of the FT process. In addition to step 615, both steps 626 and 628 also proceed from step 614 and are discussed further below.

Continuing to refer to in FIG. 6A, but turning to step 620, steam is generated and sent via a first steam flowline that is connected to a steam superheater. In step 622, a first portion of the steam, upstream of the steam superheater, is diverted into a second steam flowline, leaving a second portion of the steam in the first steam flowline to be sent to the steam superheater. Steps 623 and 624 both proceed from step 622. Turning first to step 623, the steam superheater superheats the second portion of the steam. Step 625 includes sending the superheated steam through a fourth steam flowline having a flow control regulator configuration connection with a fifth steam flowline. The flow control regulator configuration connection allows a predetermined amount of superheated steam from the fifth steam flowline into a converted stream flowline, upstream of a mixed feed preheater coil. The flow control regulator configuration connection may comprise (1) the fourth steam flowline having a connection with the fifth steam flowline, (2) the fifth steam flowline having a fifth steam flowline flow control regulator downstream of the connection with the fourth steam flowline, and (3) the fourth steam flowline having a fourth stream line flow control regulator downstream of the connection of the fourth steam flowline with the fifth steam flowline. Step 664 (depicted on FIG. 6B) follows step 625 and is discussed further below. Turning now to step 624, which follows step 622, a third portion of the steam is diverted from the first portion of the steam and is provided, through a third steam flowline, to heat a recycled gas superheater and an FT water preheater in steps 626 and 628, respectively. Steps 626 and 628 follow both step 624 and step 614. In step 626, the FT water stream is sent from the FT reactor to the FT water preheater, where the FT water is preheated to a temperature below saturation point, using heat from the third portion of the steam (see step 624). The flowchart transitions from step 626 to step 640, which is depicted in FIG. 6B. In step 628, the FT tail gas is sent from the FT reactor to the recycled gas superheater, where the FT tail gas is superheated, also using heat from the third portion of the steam (see step 624). In step 630, which proceeds from both step 628 and step 600, the superheated FT tail gas is combined with the preheated sweet natural gas to create a feed gas. The flowchart transitions from step 630 to step 642, depicted in FIG. 6B.

Turning now to FIG. 6B, in step 640, which proceeds from step 626 of FIG. 6A, the preheated FT water is sent to a first gas desuperheater. In step 642, which proceeds from step 630 of FIG. 6A, the feed gas is also sent to the first gas desuperheater. At the first gas desuperheater, in step 644, a first portion of the preheated FT water stream is directly injected into the feed gas to form a mixed gas stream. The first portion of the preheated FT water is in an amount selected to keep the mixed gas stream entirely in the vapor phase after the injection, leaving a second portion of the FT water stream to be conveyed to a second gas desuperheater. Steps 645 and 646 both proceed from step 644. Step 646 is discussed below. In step 645, the mixed gas stream is sent to the mixed gas superheater. Step 610, of FIG. 6A, follows step 645. As previously described, in step 610, the heat from intermediate temperature syngas superheats the mixed gas stream, without the intermediate temperature syngas mixing with the mixed gas stream, Step 610 is followed by step 650 of FIG. 6B. In step 650 the superheated mixed gas stream is sent to a second gas desuperheater. Turning now to step 646, which like step 645 follows step 644, the second portion of the FT water stream is conveyed to the second gas desuperheater. In step 660, which follows both step 646 and step 650, the second gas desuperheater directly injects at least part of the second portion of the FT water stream into the superheated mixed gas stream, resulting in a second mixed gas stream. The at least part of the second portion of the FT water stream is selected to be in an amount such that the second mixed gas stream is entirely in the vapor phase after the injection of the second portion of the FT water stream. In Step 662, the second mixed gas stream is sent to a shift reactor that converts a portion of the carbon monoxide and water in the second mixed gas stream to carbon dioxide and hydrogen, forming a converted mixed gas stream.

Continuing to refer to FIG. 6B, in step 663, the converted mixed gas stream is sent through the converted stream flowline that feeds the mixed feed preheater coil and that has a connection with the fifth steam flowline upstream of the mixed feed preheater coil. In step 664, which follows both step 625 and step 663, the predetermined amount of superheated steam from the fifth steam flowline is added to the converted mixed gas stream, such that the predetermined amount of the superheated steam and the converted mixed gas form a second mixed feed gas. In step 666, the second mixed feed gas is sent to the mixed feed preheater coil, where the second mixed feed gas is preheated. The preheated second mixed feed gas is sent 670 from the mixed feed preheater coil to the front end of the SMR to be used as an input. Step 602 of FIG. 6A follows step 670. Once begun, the process steps as described in FIG. 6A and FIG. 6B are continuous and may run twenty-four hours a day for years, until the reactors are shut down for maintenance or other reasons.

While some preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention. The inclusion or discussion of a reference is not an admission that it is prior art to the present invention, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A method of producing Fischer-Tropsch ("FT") hydrocarbons via FT synthesis in an FT reactor having an FT synthesis catalyst, the method comprising:
    a. producing a reformed gas comprising hydrogen and carbon monoxide in a syngas preparation unit having a front end and a feed comprising a carbonaceous feedstock and steam;
    b. conditioning the reformed gas by removing process condensate therefrom;
    c. producing liquid FT hydrocarbons, an FT tail gas and an FT water stream using the conditioned reformed gas in the FT reactor, under FT conditions;
    d. superheating at least a first portion of the FT tail gas;
    e. injecting at least a first portion of the FT water stream into the at least a first portion of the superheated FT tail gas to form a mixed gas, wherein the amount of the at least a first portion of the FT water stream to be injected into the at least a first portion of the superheated FT tail gas to form the mixed gas is selected to keep the mixed gas in an at least mostly vapor phase; and
    f. recycling the mixed gas as part of the feed to the front end of the syngas preparation unit.

2. The method of claim 1, wherein the superheating step (d) comprises superheating at least a first portion of the FT tail gas to a temperature of about 400° F.

3. The method of claim 1 or 2, further comprising:
    g. removing excess water from the mixed gas.

4. The method of claim 1, wherein the amount of the at least a first portion of the FT water stream to be injected into the superheated FT tail gas to form the mixed gas is selected to keep the mixed gas in an entirely vapor phase.

5. The method of claim 4, wherein the carbonaceous feedstock comprises natural gas and further comprising:
    g. preheating the natural gas;
    h. sweetening the natural gas, wherein the sweetening and preheating steps may be performed in any order; and i. adding the preheated sweet natural gas to the superheated FT tail gas, prior to an injection of at least a portion of the FT water stream.

6. The method of claim 4, wherein portions of the FT water are injected into the superheated FT tail gas in at least two stages, each injection keeping the mixed gas entirely in a vapor phase and wherein the FT tail gas is superheated upstream of each stage of injection of the portions of the FT water stream.

7. The method of claim 6, wherein the injections of the portions of the FT water stream into the superheated FT tail gas are each performed using separate desuperheaters.

8. The method of claim 1, wherein the syngas preparation unit comprises a steam methane reformer having a steam methane reformer catalyst.

9. The method of claim 1, wherein the syngas preparation unit comprises an autothermal reformer.

10. The method of claim 1, wherein the syngas preparation unit comprises a partial oxidation reformer.

11. The method of claim 1, wherein the syngas preparation unit comprises a hybrid reformer.

12. The method of claim 1, wherein the conditioning step further comprises:
   g. adjusting the reformed gas's ratio of hydrogen to carbon monoxide to a predetermined level.

13. The method of claim 12, wherein the conditioning step includes removing hydrogen from the reformed gas and further comprising:
   using the removed hydrogen as a fuel for the syngas preparation unit.

14. The method of claim 12, wherein the injection of the at least a first portion of the FT water stream into the superheated FT tail gas is performed using a desuperheater.

15. The method of claim 4, further comprising:
   g. removing a carbon dioxide stream from a second portion of the FT tail gas; and
   h. adding at least a first portion of the carbon dioxide stream to the FT tail gas upstream of the injection of the FT water stream.

16. The method of claim 4, further comprising:
   g. sending the mixed gas to a water-gas shift reactor to form a converted mixed gas;
   h. adding the steam to the converted mixed gas to form a converted feed; and
   i. using the converted feed as an additional feed to the front end of the syngas preparation unit.

17. The method of claim 4, further comprising:
   g. sending a second portion of the FT tail gas from the FT reactor to a CO2 removal unit;
   h. using the CO2 removal unit to remove a CO2 gas stream from the second portion of the FT tail gas;
   i. adding at least a portion of the CO2 gas stream to the FT tail gas upstream of the superheating step to form a first mixed gas, so that the first mixed gas is superheated in the superheating step;
   j. sweetening the carbonaceous feedstock which comprises a natural gas;
   k. preheating the sweet natural gas;
   l. adding the preheated sweetened natural gas to the superheated first mixed gas upstream of the injection of the at least a first portion of the FT water stream to form a second mixed gas, so that the injection of the at least a first portion of the FT water stream into the second mixed gas forms a third mixed gas;
   m. sending the third mixed gas through a water-gas shift reactor to form a converted mixed gas;
   n. adding steam to the converted mixed gas to form a converted feed; and
   o. using the converted feed as a feed to the front end of the syngas preparation unit.

18. The method of claim 17, further comprising:
   p. sending a third portion of the FT tail gas from the output of the FT reactor to be used as a feed for the FT reactor.

19. A method of producing reformed gas as part of a Fischer-Tropsch ("FT") hydrocarbons synthesis comprising:
   a. superheating at least a first portion of an FT tail gas produced as a by-product of an FT synthesis process;
   b. preheating an FT water stream produced as a by-product of the FT synthesis process;
   c. forming a mixed gas comprising at least a portion of the FT water stream injected into the superheated FT tail gas, the amount of the at least a portion of the FT water selected to keep the mixed gas entirely in a vapor phase;
   d. forming a converted mixed gas by sending the mixed gas through a water-gas shift reactor;
   e. adding steam to the converted mixed gas to form a converted feed; and
   f. using the converted feed as a part of a feed also comprising a carbonaceous feedstock to a front end of a syngas preparation unit.

20. The method of claim 19, wherein the carbonaceous feedstock comprises a sweet natural gas and further comprising
   g. pre-heating the sweet natural gas; and
   h. adding the preheated, sweet natural gas to the superheated FT tail gas prior to forming the mixed gas.

21. The method of claim 20, wherein the syngas preparation unit comprises a steam methane reformer or an autothermal reformer.

22. The method of claim 20, further comprising:
   h. sending a second portion of the FT tail gas to a carbon dioxide removal unit;
   i. using the carbon dioxide removal unit to remove a carbon dioxide stream from the second portion of the FT tail gas; and
   j. adding at least a portion of the carbon dioxide stream to the at least a first portion of the FT tail gas upstream of the superheating step to form a mixture, so that the mixture is superheated in the superheating step.

23. The method of claim 21, wherein the syngas preparation unit comprises a steam methane reformer.

* * * * *

UNITED STATES PATENT AND TRADEMARK OFFICE
CERTIFICATE OF CORRECTION

PATENT NO. : 10,041,006 B2
APPLICATION NO. : 15/315127
DATED : August 7, 2018
INVENTOR(S) : Leo Bonnell et al.

It is certified that error appears in the above-identified patent and that said Letters Patent is hereby corrected as shown below:

In the Specification

Figure 6C:
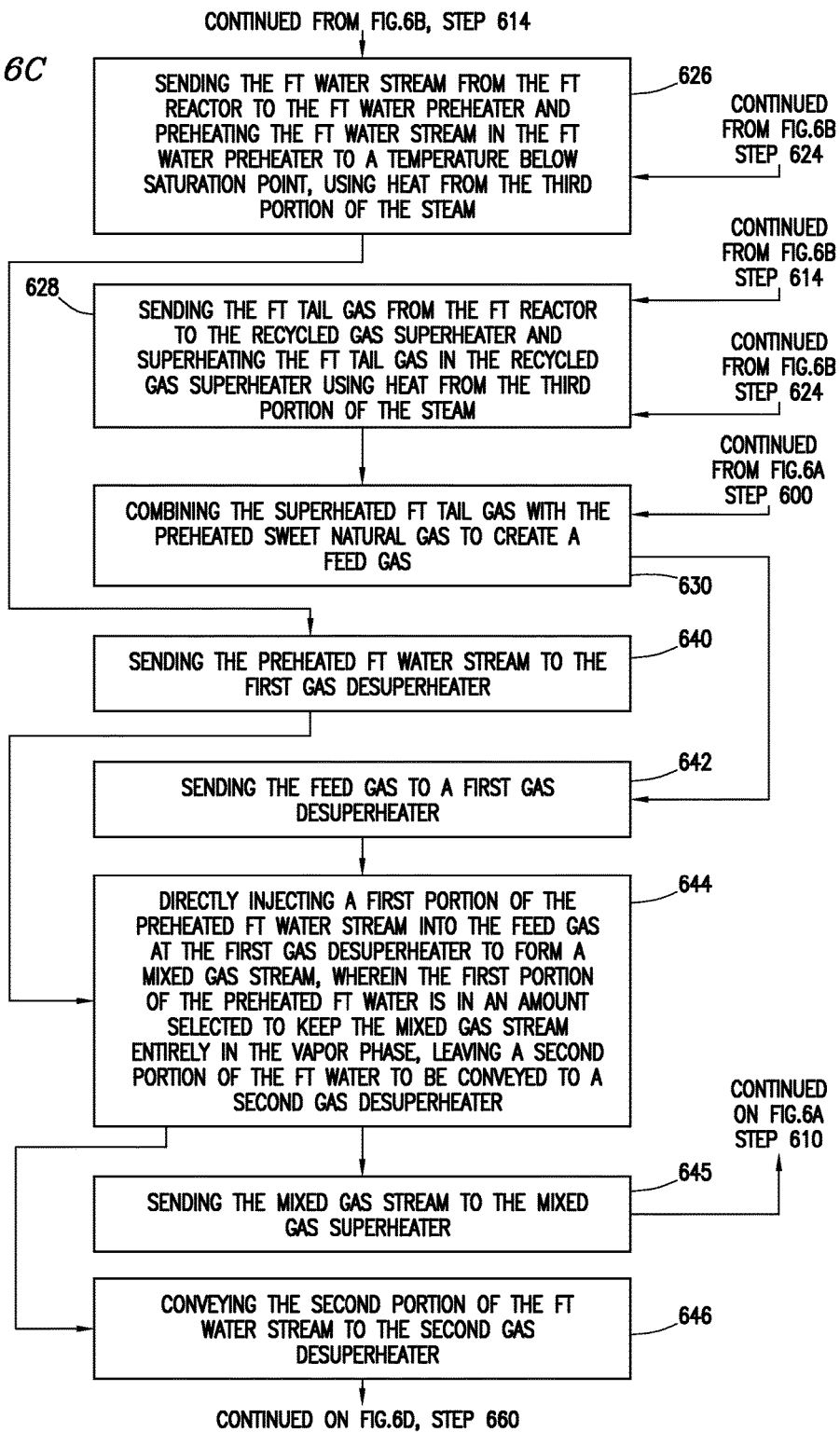

Column 9, Line 11 is amended to be:
FIG. 6A, FIG. 6B, FIG. 6C, and FIG. 6D are parts of a detailed flowchart for Column 17, Line 52 is amended to be:
FIG. 6A, FIG. 6B, FIG. 6C, and FIG. 6D are parts of a flowchart for a Column 18, Line 27 is amended to be:
FT catalyst are used. Referring now to FIG. 6B, in step 614, the syngas passes into the Column 18, Line 35 is amended to be:
Continuing to refer to FIG. 6B, but turning to step 620, Column 18, Line 58 is amended to be:
664 (depicted in FIG. 6D) follows step 625 and is discussed Column 18, Line 63 is amended to be:
preheater in steps 626 and 628, respectively. Referring now to FIG. 6C, steps 626 and Column 19, Line 2 is amended to be:
626 to step 640, which is depicted in FIG. 6C. In step 628, Column 19, Line 9 is amended to be:
sitions from step 630 to step 642, as depicted in FIG. 6C.

Column 19, Line 10 is amended to be:
Continuing to refer to FIG. 6C, in step 640, which proceeds Signed and Sealed this
Eleventh Day of September, 2018

Andrei Iancu
*Director of the United States Patent and Trademark Office*

CERTIFICATE OF CORRECTION (continued)
U.S. Pat. No. 10,041,006 B2

Column 19, Line 11 is amended to be:
from step 626, the preheated FT water is sent to Column 19, Line 13 is amended to be:
step 630, the feed gas is also sent to the first gas Column 19, Line 27 is amended to be:
with the mixed gas stream. Step 610 is followed by step 650

Figure 6D:
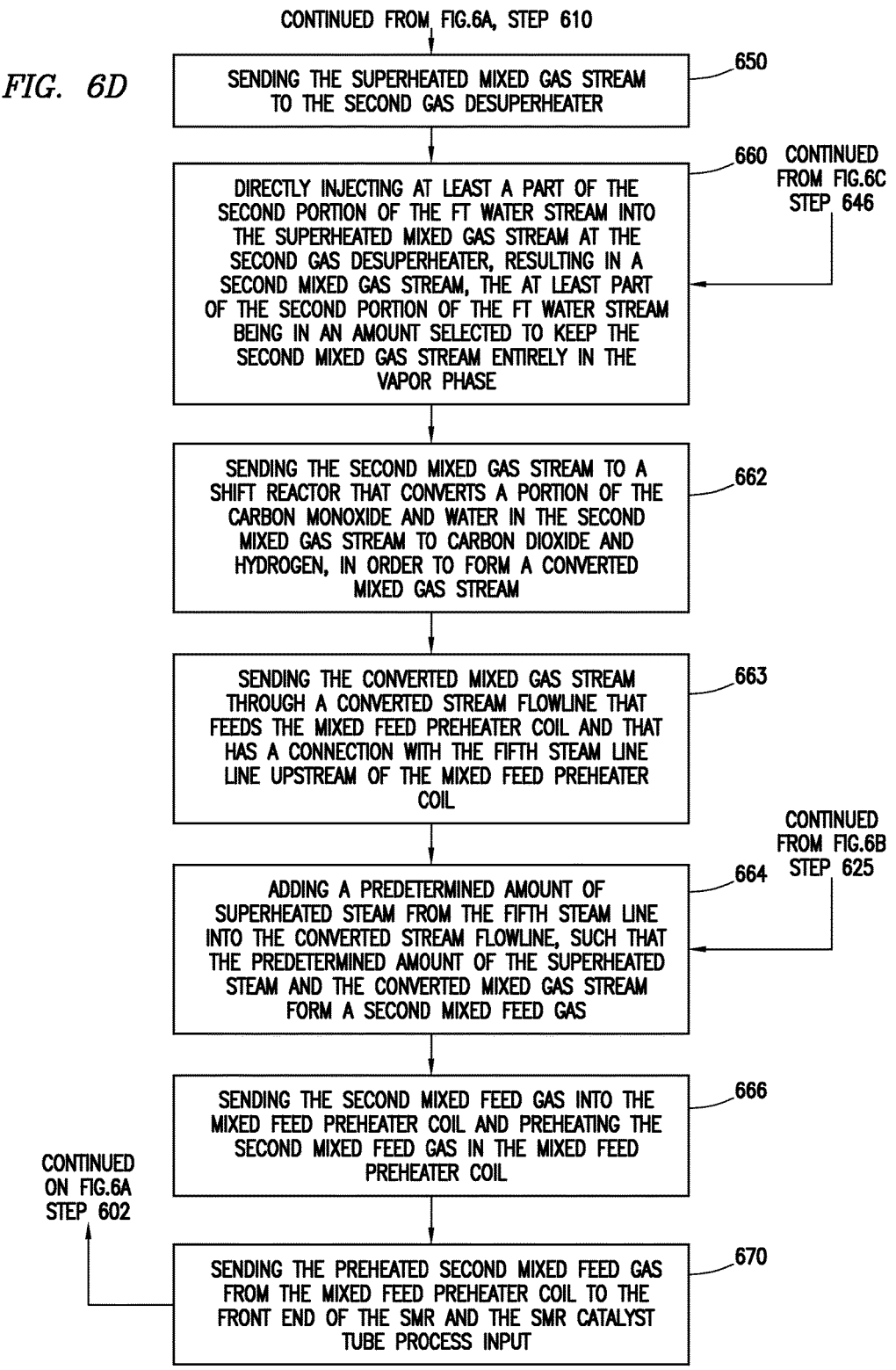

Column 19, Line 28 is amended to be:
of FIG. 6D. In step 650 the superheated mixed gas stream is Column 19, Line 44 is amended as follows:
Continuing to refer to FIG. 6D, in step 663, the converted Column 19, Line 60 is amended to be:
6B and FIG. 6C and FIG. 6D are continuous and may run twenty-four hours a day for